US 12,497,318 B2

(12) United States Patent
Lock et al.

(10) Patent No.: US 12,497,318 B2
(45) Date of Patent: Dec. 16, 2025

(54) METHODS AND APPARATUS FOR MANUFACTURING A GLASS RIBBON

(71) Applicant: Corning Incorporated, Corning, NY (US)

(72) Inventors: William Edward Lock, Horseheads, NY (US); Aniello Mario Palumbo, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 140 days.

(21) Appl. No.: 17/491,964

(22) Filed: Oct. 1, 2021

(65) Prior Publication Data

US 2022/0106216 A1 Apr. 7, 2022

Related U.S. Application Data

(60) Provisional application No. 63/086,675, filed on Oct. 2, 2020.

(51) Int. Cl.
*C03C 23/00* (2006.01)
*B29C 59/02* (2006.01)
(Continued)

(52) U.S. Cl.
CPC ............ *C03B 13/08* (2013.01); *B29C 59/022* (2013.01); *B31F 1/07* (2013.01); *C03B 23/0357* (2013.01); *C03B 35/14* (2013.01)

(58) Field of Classification Search
CPC ......... C03B 13/08; C03B 35/00; C03B 35/14; C03B 23/0254; C03B 17/065;
(Continued)

(56) References Cited

U.S. PATENT DOCUMENTS

| 370,178 | A | * | 9/1887 | Brogan | ................... C03B 13/08 |
| | | | | | 65/245 |
| 1,028,129 | A | * | 6/1912 | Neuhauser | .............. C03B 13/08 |
| | | | | | 65/94 |

(Continued)

FOREIGN PATENT DOCUMENTS

| CN | 101360689 A | * | 2/2009 | ........... B29C 59/046 |
| CN | 101677112 A | * | 3/2010 | ............. C03B 13/08 |

(Continued)

OTHER PUBLICATIONS

International Search Report and Written Opinion of the International Searching Authority; PCT/US21/52124; dated Jan. 12, 2022; 12 pages; European Patent Office.

(Continued)

*Primary Examiner* — Alison L Hindenlang
*Assistant Examiner* — Steven S Lee

(57) ABSTRACT

A glass manufacturing apparatus includes a delivery apparatus defining a travel path extending in a first travel direction. The delivery apparatus conveys a stream of molten glass along the travel path. The glass manufacturing apparatus includes a first forming roll and a second forming roll spaced to define a gap that provides a glass ribbon with a width and a thickness. One or more of the first forming roll or the second forming roll include a textured feature that imparts a corresponding textured feature to the glass ribbon. The glass manufacturing apparatus includes a mold defining a mold cavity. The mold is positioned to receive a portion of the glass ribbon to impart a shape to the portion. The glass manufacturing apparatus includes a conveyor that moves the mold in a second travel direction angled relative to the first travel direction. Methods of manufacturing a glass ribbon are provided.

20 Claims, 7 Drawing Sheets

(51) Int. Cl.
  *B31F 1/07* (2006.01)
  *C03B 13/08* (2006.01)
  *C03B 23/035* (2006.01)
  *C03B 35/14* (2006.01)
(58) Field of Classification Search
  CPC ..... C03B 13/183; C03B 23/0357; B44F 5/00; B29C 59/022; B31F 1/07
  See application file for complete search history.

(56) References Cited

U.S. PATENT DOCUMENTS

| | | | | |
|---|---|---|---|---|
| 1,528,194 | A * | 3/1925 | Burgess | E05F 3/02 65/255 |
| 1,662,295 | A * | 3/1928 | Burgess | C03B 13/08 65/94 |
| 1,766,680 | A * | 6/1930 | Parham | C03B 9/12 65/92 |
| 3,841,857 | A * | 10/1974 | Harcuba | C03B 13/04 65/96 |
| 4,261,706 | A * | 4/1981 | Blanding | E01C 7/085 264/650 |
| 4,361,429 | A * | 11/1982 | Anderson | C03B 23/0302 65/184 |
| 5,224,978 | A * | 7/1993 | Hermant | C03C 17/007 65/93 |
| 5,622,019 | A * | 4/1997 | Dorough, Jr. | C03B 13/08 52/456 |
| 5,834,888 | A * | 11/1998 | Allen | H01J 61/12 313/484 |
| 5,885,315 | A * | 3/1999 | Fredholm | C03B 13/08 65/102 |
| 5,970,747 | A * | 10/1999 | Fredholm | C03B 13/12 65/254 |
| 6,130,777 | A * | 10/2000 | Yamashita | G02B 5/0268 359/619 |
| 6,586,077 | B1 * | 7/2003 | Pettis | E04C 2/54 52/311.1 |
| 6,679,085 | B1 * | 1/2004 | Singer | C03B 13/08 65/273 |
| 6,796,146 | B2 * | 9/2004 | Burnham | B44F 5/00 65/95 |
| 7,114,353 | B1 * | 10/2006 | Charlton | E06B 3/6608 65/93 |
| 7,229,681 | B2 * | 6/2007 | Boegli | B31F 1/07 72/196 |
| 8,713,972 | B2 | 5/2014 | Lakota et al. | |
| 9,003,835 | B2 | 4/2015 | Lock | |
| 9,308,133 | B2 * | 4/2016 | Mullane | B26F 1/18 |
| 9,676,649 | B2 | 6/2017 | Dobbins et al. | |
| 9,896,368 | B2 | 2/2018 | Klein et al. | |
| 10,246,365 | B2 * | 4/2019 | Bisson | C03B 35/246 |
| 10,259,736 | B2 * | 4/2019 | Fredholm | C03B 13/16 |
| 2001/0000277 | A1 * | 4/2001 | Anderson | B01L 3/5085 65/67 |
| 2001/0038929 | A1 * | 11/2001 | Uhlik | G11B 5/8404 428/846.9 |
| 2004/0045321 | A1 * | 3/2004 | Jousse | C03B 17/065 349/32 |
| 2004/0191482 | A1 * | 9/2004 | Nakajima | B29C 59/022 428/156 |
| 2007/0116913 | A1 * | 5/2007 | Kimura | C03B 17/064 65/94 |
| 2009/0162623 | A1 * | 6/2009 | Foresti | C03B 23/02 65/102 |
| 2011/0236631 | A1 * | 9/2011 | Bisson | C03B 17/065 428/141 |
| 2012/0282438 | A1 | 11/2012 | Kuhn et al. | |
| 2012/0304695 | A1 * | 12/2012 | Lakota | C03B 13/04 65/97 |
| 2013/0052414 | A1 * | 2/2013 | Dobbins | C03C 19/00 65/44 |
| 2013/0133369 | A1 * | 5/2013 | Lock | C03B 17/065 65/93 |
| 2014/0283554 | A1 * | 9/2014 | Fredholm | C03B 17/062 65/90 |
| 2015/0099618 | A1 * | 4/2015 | Bisson | C03B 17/061 65/25.2 |
| 2017/0107140 | A1 * | 4/2017 | Funatsu | C03B 23/02 |
| 2018/0147826 | A1 | 5/2018 | Inamura et al. | |
| 2019/0169059 | A1 * | 6/2019 | Fredholm | C03B 13/16 |

FOREIGN PATENT DOCUMENTS

| | | | | |
|---|---|---|---|---|
| CN | 104220386 A | | 12/2014 | |
| CN | 206922871 U | | 1/2018 | |
| EP | 1357089 A2 * | | 10/2003 | ............ C03B 13/08 |
| EP | 2258664 A1 * | | 12/2010 | ............ C03B 13/08 |
| FR | 2676729 A1 * | | 11/1992 | ............ C03B 9/12 |
| GB | 991867 A * | | 5/1965 | |
| JP | 09-102276 A | | 4/1997 | |
| JP | 2000203853 A * | | 7/2000 | ............ C03B 13/14 |
| JP | 5434948 B2 | | 3/2014 | |
| JP | 5751208 B2 | | 7/2015 | |
| JP | 5751209 B2 | | 7/2015 | |
| JP | 5862768 B2 | | 2/2016 | |
| KR | 20100017454 A * | | 2/2010 | ............ C03B 13/08 |
| WO | 2013/168625 A1 | | 11/2013 | |
| WO | 2017/214134 A1 | | 12/2017 | |
| WO | 2018/200919 A1 | | 11/2018 | |
| WO | WO-2019089525 A1 * | | 5/2019 | ............ C03B 13/04 |

OTHER PUBLICATIONS

Inamura et al., "Additive Manufacturing of Transparent Glass Structures", 3D Printing and Additive Manufacturing, vol. 5, No. 4, 2018, 17 pages.

Klein et al., "Additive Manufacturing of Optically Transparent Glass", Submitted to the Program in Media Arts and Sciences, School of Architecture and Planning, vol. 2, No. 3, 2015, 96 pages.

Chinese Patent Application No. 202180080858.1 , Office Action dated Mar. 28, 2025, 5 pages (English Translation only), Chinese Patent Office.

* cited by examiner

… … … … … … … … … … … … … … … … … … … … … … … … … … … … … … … … … … … … … … … … … … … … … … … … … … … …

METHODS AND APPARATUS FOR MANUFACTURING A GLASS RIBBON

CROSS-REFERENCE TO RELATED APPLICATION

This application claims the benefit of priority under 35 U.S.C. § 119 of U.S. Provisional Application Ser. No. 63/086,675 filed on Oct. 2, 2020, the content of which is relied upon and incorporated herein by reference in its entirety.

FIELD

The present disclosure relates generally to methods for manufacturing a glass ribbon and, more particularly, to methods for manufacturing a glass ribbon with a glass manufacturing apparatus comprising a mold.

BACKGROUND

It is known to manufacture molten material into a glass ribbon with a glass manufacturing apparatus. A pair of forming rolls can be spaced apart to define a gap that can receive the molten material. The molten material can pass through the gap, whereupon the molten material can be flattened into a glass ribbon. A shape can be imparted to the glass ribbon by grinding, machining, and/or polishing the glass ribbon. However, the grinding, machining, and/or polishing process is inefficient and costly. In addition, there are limitations on the shape that may be imparted to the glass ribbon by this process.

SUMMARY

The following presents a simplified summary of the disclosure to provide a basic understanding of some embodiments described in the detailed description.

There are set forth methods of manufacturing a glass ribbon, comprising introducing a stream of molten glass along a travel path in a travel direction to a gap defined between a first forming roll and a second forming roll, and passing the stream of molten glass through the gap to form a glass ribbon. Methods comprise forming a textured feature in the glass ribbon by contacting the stream of molten glass with the first forming roll and the second forming roll. The first forming roll and/or the second forming roll can comprise a textured feature (e.g., a channel, a protrusion, indicia, for example, a signature, etc.) that can be imparted to the stream of molten glass as the stream of molten glass contacts the first forming roll and the second forming roll. In addition, the glass ribbon can be delivered from the gap to one or more molds supported on a conveyor. A vacuum can be formed between the molds and the glass ribbon, thus imparting a non-planar shape to the glass ribbon. The textured feature and/or the non-planar shape can be imparted to the glass ribbon as the glass ribbon continues to move. As such, additional machining (e.g., grinding, etc.) to form textured features and/or non-planar shapes may be avoided. Additionally, the glass ribbon can be formed with dimensions that substantially match final desired dimensions (e.g., within about 100 microns), further reducing any additional machining.

Embodiment 1. A glass manufacturing apparatus comprises a delivery apparatus defining an upstream portion of a travel path extending in a first travel direction. The delivery apparatus conveys a stream of molten glass along the upstream portion of the travel path in the first travel direction. The glass manufacturing apparatus comprises a first forming roll and a second forming roll spaced from the first forming roll to define a gap that provides a glass ribbon with a width and a thickness. One or more of the first forming roll or the second forming roll comprises a textured feature that imparts a corresponding textured feature to the glass ribbon. The glass manufacturing apparatus comprises a mold defining a mold cavity. The mold is positioned downstream from the gap and receives a portion of the glass ribbon within the mold cavity to impart a shape to the portion of the glass ribbon. The glass manufacturing apparatus comprises a conveyor supporting the mold. The conveyor moves the mold in a second travel direction that is angled relative to the first travel direction.

Embodiment 2. The glass manufacturing apparatus of embodiment 1, wherein the first forming roll and the second forming roll each comprise a first length that is greater than or equal to a width of the travel path.

Embodiment 3. The glass manufacturing apparatus of embodiment 2, wherein the textured feature comprises a length that is greater than or equal to the width of the travel path.

Embodiment 4. The glass manufacturing apparatus of embodiment 2, wherein the textured feature comprises a length that is less than the width of the travel path.

Embodiment 5. The glass manufacturing apparatus of any one of embodiments 1-4, further comprising a second mold defining a second mold cavity that receives a second portion of the glass ribbon within the second mold cavity to impart a shape to the second portion of the glass ribbon.

Embodiment 6. The glass manufacturing apparatus of embodiment 5, wherein the second mold is upstream from the mold relative to the second travel direction.

Embodiment 7. The glass manufacturing apparatus of any one of embodiments 1-6, wherein the corresponding textured feature of the glass ribbon comprises a varying thickness within the glass ribbon.

Embodiment 8. The glass manufacturing apparatus of any one of embodiments 1-7, wherein the textured feature comprises indicia comprising one or more of a logo or text.

Embodiment 9. Methods of manufacturing a glass ribbon comprise delivering a stream of molten glass along a travel path in a first travel direction to a gap defined between a first forming roll and a second forming roll. One or more of the first forming roll or the second forming roll comprise a textured feature. Methods comprise passing the stream of molten glass through the gap to form a glass ribbon. Methods comprise imparting a corresponding textured feature to the glass ribbon with the textured feature of the one or more of the first forming roll or the second forming roll. Methods comprise delivering the glass ribbon to a mold cavity defined by a mold positioned on a conveyor downstream from the gap. Methods comprise imparting a shape to the glass ribbon by receiving the glass ribbon within the mold cavity.

Embodiment 10. Methods of embodiment 9, wherein the first forming roll and the second forming roll each comprise a first length that is greater than or equal to a width of the glass ribbon.

Embodiment 11. Methods of embodiment 10, wherein the textured feature comprises a length that differs from the width of the glass ribbon.

Embodiment 12. Methods of any one of embodiments 9-11, wherein the passing the stream of molten glass through the gap comprises forming the glass ribbon with a thickness that is within about 100 microns of a final thickness of the glass ribbon and a width that is within about 100 microns of a final width of the glass ribbon.

Embodiment 13. Methods of embodiment 12, wherein the final thickness of the glass ribbon is within a range of from about 0.5 millimeters to about 5 millimeters.

Embodiment 14. Methods of any one of embodiments 9-13, wherein the imparting the shape comprises forming a vacuum between the glass ribbon and the mold as the glass ribbon is received within the mold cavity.

Embodiment 15. Methods of any one of embodiments 9-14, wherein the imparting the corresponding textured feature comprises forming one or more of a thickness variation or a non-planar shape in the glass ribbon.

Embodiment 16. Methods of manufacturing a glass ribbon comprise delivering a stream of molten glass along a travel path in a first travel direction to a gap defined between a first forming roll and a second forming roll. One or more of the first forming roll or the second forming roll comprise a textured feature. Methods comprise passing the stream of molten glass through the gap to form a glass ribbon. Methods comprise imparting a corresponding textured feature to a first portion of the glass ribbon with the textured feature of the one or more of the first forming roll or the second forming roll. Methods comprise delivering the first portion of the glass ribbon to a first mold cavity defined by a first mold positioned on a conveyor. Methods comprise imparting a first shape to the first portion of the glass ribbon by receiving the first portion of the glass ribbon within the first mold cavity. Methods comprise moving the first mold along a second travel direction at an angle relative to the first travel direction. Methods comprise delivering the second portion of the glass ribbon to a second mold cavity defined by a second mold positioned on the conveyor. Methods comprise imparting a second shape to the second portion of the glass ribbon by receiving the second portion of the glass ribbon within the second mold cavity.

Embodiment 17. Methods of embodiment 16, wherein the first forming roll and the second forming roll each comprise a first length that is greater than or equal to a width of the glass ribbon.

Embodiment 18. Methods of embodiment 17, wherein the textured feature comprises a length that differs from the width of the glass ribbon.

Embodiment 19. Methods of any one of embodiments 16-18, wherein the imparting the shape comprises forming a vacuum between the first portion of the glass ribbon and the first mold as the first portion of the glass ribbon is received within the first mold cavity.

Embodiment 20. Methods of any one of embodiments 16-19, wherein the imparting the second shape comprises forming a vacuum between the second portion of the glass ribbon and the second mold as the second portion of the glass ribbon is received within the second mold cavity.

Additional features and advantages of the embodiments disclosed herein will be set forth in the detailed description that follows, and in part will be clear to those skilled in the art from that description or recognized by practicing the embodiments described herein, including the detailed description which follows, the claims, as well as the appended drawings. It is to be understood that both the foregoing general description and the following detailed description present embodiments intended to provide an overview or framework for understanding the nature and character of the embodiments disclosed herein. The accompanying drawings are included to provide further understanding and are incorporated into and constitute a part of this specification. The drawings illustrate various embodiments of the disclosure, and together with the description explain the principles and operations thereof.

BRIEF DESCRIPTION OF THE DRAWINGS

These and other features, embodiments and advantages are better understood when the following detailed description is read with reference to the accompanying drawings, in which.

DETAILED DESCRIPTION

Figure 1:
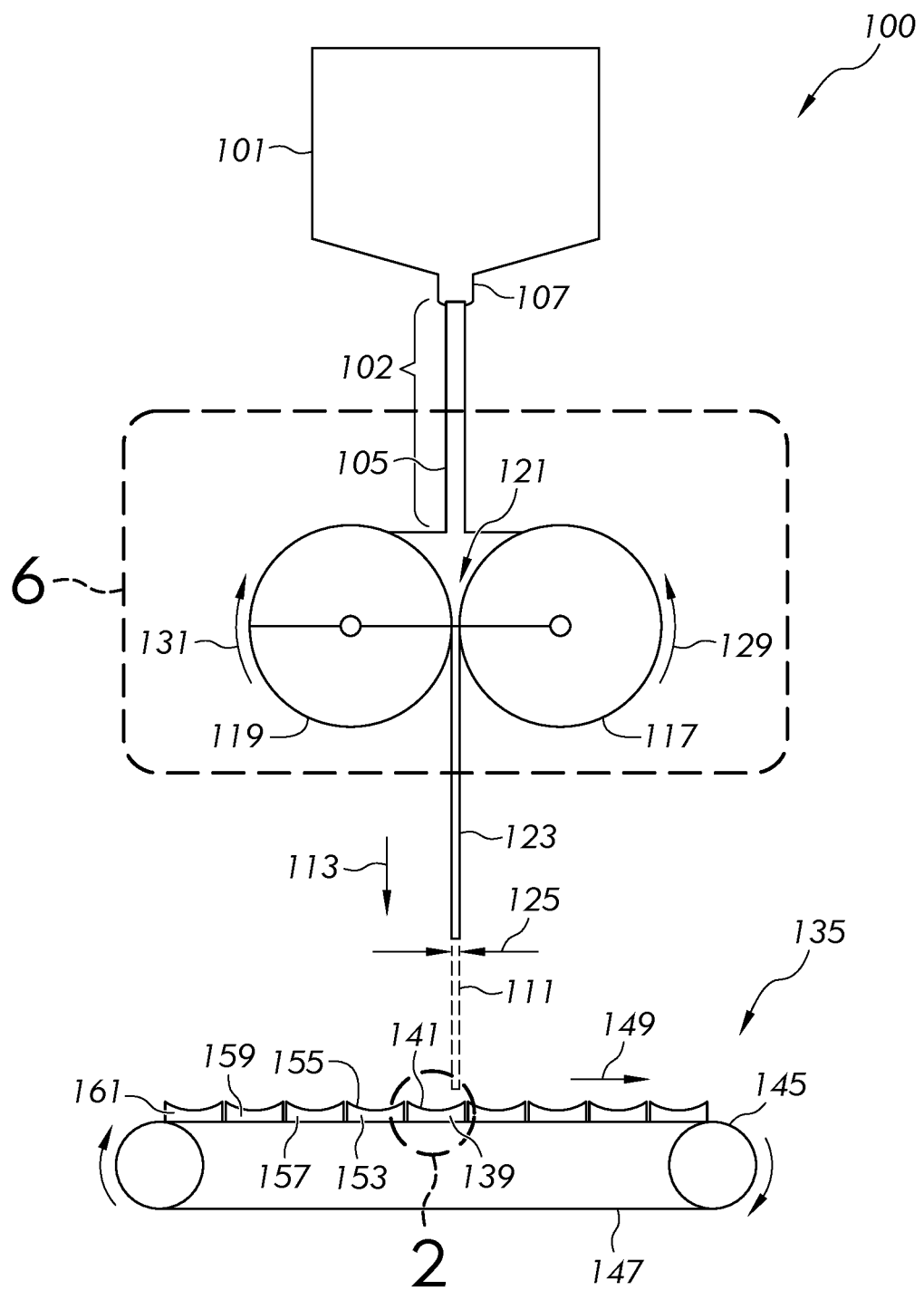
FIG. 1 schematically illustrates example embodiments of a glass manufacturing apparatus in accordance with embodiments of the disclosure.

Embodiments will now be described more fully hereinafter with reference to the accompanying drawings in which example embodiments are shown. Whenever possible, the same reference numerals are used throughout the drawings to refer to the same or like parts. However, this disclosure may be embodied in many different forms and should not be construed as limited to the embodiments set forth herein.

The present disclosure relates to a glass manufacturing apparatus and methods for forming a glass ribbon. For purposes of this application, "glass ribbon" may be considered one or more of a glass ribbon in a viscous state, a glass ribbon in an elastic state (e.g., at room temperature) and/or a glass ribbon in a viscoelastic state between the viscous state and the elastic state. Methods and apparatus for forming a glass ribbon will now be described by way of example embodiments. As schematically illustrated in FIG. 1, in some embodiments, an exemplary glass manufacturing apparatus 100 can comprise a delivery apparatus 101 with a delivery conduit 107 through which the stream of molten glass 105 can exit the delivery apparatus 101. For example, in some embodiments, the delivery conduit 107 can comprise an elongated passageway with an opening at the end of the delivery conduit 107. The opening of the delivery conduit 107 can, in some embodiments, comprise a substantially circular shape such that the stream of molten glass 105 can comprise a rounded, substantially circular cross-sectional shape upon exiting the delivery conduit 107. In some embodiments, the delivery conduit 107 can comprise a non-circular shape, such as an elongated shape in which one dimension (e.g., a width) may be greater than another dimension (e.g., .a thickness) such that the stream of molten glass 105 can comprise a flattened shape in which the width is greater than the thickness. In some embodiments, the delivery conduit 107 can comprise an opening (e.g., without an elongated portion extending downwardly from the delivery apparatus 101) at a bottom of the delivery apparatus 101, wherein the stream of molten glass 105 can exit the opening. In some embodiments, the delivery conduit 107 can be oriented along a direction of gravity, such that the stream of molten glass 105 can flow downwardly along the direction of gravity through the delivery conduit 107.

In some embodiments, the delivery apparatus 101 can define an upstream portion 102 of a travel path 111 extending in a first travel direction 113. The delivery apparatus 101 can convey the stream of molten glass 105 along the upstream portion 102 of the travel path 111 in the first travel direction 113. In some embodiments, the glass manufacturing apparatus 100 can comprise one or more pairs of opposing forming rolls, for example, a first forming roll 117 and a second forming roll 119. In some embodiments, the second forming roll 119 may be spaced from the first forming roll 117 to define a gap 121. The gap 121 may provide a glass ribbon 123 with a width (e.g., width 731 of the glass ribbon 123 illustrated in FIG. 7) and a thickness 125. In some embodiments, the first forming roll 117 and the second forming roll 119 can rotate counter to one another. For example, in the orientation shown in FIG. 1, the first forming roll 117 can rotate in a counter-clockwise direction 129 while the second forming roll 119 can rotate in a clockwise direction 131. In some embodiments, the first forming roll 117 and the second forming roll 119 can receive the stream of molten glass 105 along the travel path 111 within the gap 121. The stream of molten glass 105 can accumulate between the first forming roll 117 and the second forming roll 119, whereupon the first forming roll 117 and the second forming roll 119 can flatten, thin, and smooth the stream of molten glass 105 into the glass ribbon 123.

In some embodiments, the glass ribbon 123 can exit the gap 121 and may be delivered to a shaping apparatus 135. In some embodiments, additional rollers may be located upstream or downstream from the first forming roll 117 and the second forming roll 119 relative to the first travel direction 113. For example, in some embodiments, one or more additional forming rolls (e.g., to facilitate formation of the stream of molten glass 105 into the glass ribbon 123) may be located downstream from the pair of forming rolls (e.g., the first forming roll 117 and the second forming roll 119) relative to the first travel direction 113, and/or one or more pulling rolls (e.g., for pulling downwardly on the glass ribbon 123 to apply a force along the first travel direction 113) may be located downstream from the pair of forming rolls (e.g., the first forming roll 117 and the second forming roll 119) relative to the first travel direction 113. In some embodiments, the glass ribbon 123 can comprise one or more states of material based on the vertical location of the glass ribbon 123. For example, at one or more locations below the first forming roll 117 and the second forming roll 119, the glass ribbon 123 can comprise a viscous material.

In some embodiments, the shaping apparatus 135 can move the glass ribbon 123 while imparting a shape to the glass ribbon 123. For example, the shaping apparatus 135 can comprise a mold 139 defining a mold cavity 141. The mold 139 can be positioned downstream from the gap 121 and may receive a portion of the glass ribbon 123 within the mold cavity 141 to impart a shape to the portion of the glass ribbon 123. By being located downstream from the gap 121, in some embodiments, the mold 139 can be located downstream relative to the first travel direction 113 such that the glass ribbon 123 may first pass through the gap 121 prior to reaching the mold 139. In some embodiments, the shaping apparatus 135 can comprise a conveyor 145 supporting the mold 139. The conveyor 145 can move the mold 139 in a second travel direction 149 that may be angled relative to the first travel direction 113. In some embodiments, the conveyor 145 can comprise a belt conveyor apparatus (e.g., a belt conveyor) in which the conveyor 145 comprises two or more pulleys with a conveyor belt 147 or other endless loop carrying apparatus rotating about the pulleys. In some embodiments, one or more of the pulleys may be powered, thus moving the conveyor belt 147 and the mold 139. By being angled relative to the first travel direction 113, in some embodiments, the second travel direction 149 may be non-parallel with the first travel direction 113. For example, in some embodiments, the second travel direction 149 can comprise the direction along which the mold 139 moves when the mold 139 receives a portion of the glass ribbon 123. Accordingly, in some embodiments, when the mold 139 is in a position to receive the portion of the glass ribbon 123, for example, by being supported along a top side or top surface of the conveyor 145 that faces the first forming roll 117 and the second forming roll 119, the mold 139 can move in the second travel direction 149. In some embodiments, the second travel direction 149 can form an angle relative to the first travel direction 113 that may be within a range from about 1° to about 179°, or within a range from about 45° to about 135°, or within a range from about 60° to about 120°, or within a range from about 85° to about 95°. In the illustrated embodiments of FIGS. 1 and 3-5, the second travel direction 149 can form an angle relative to the first travel direction 113 that is about 90° (e.g., by being substantially perpendicular to the first travel direction 113).

Figure 4:
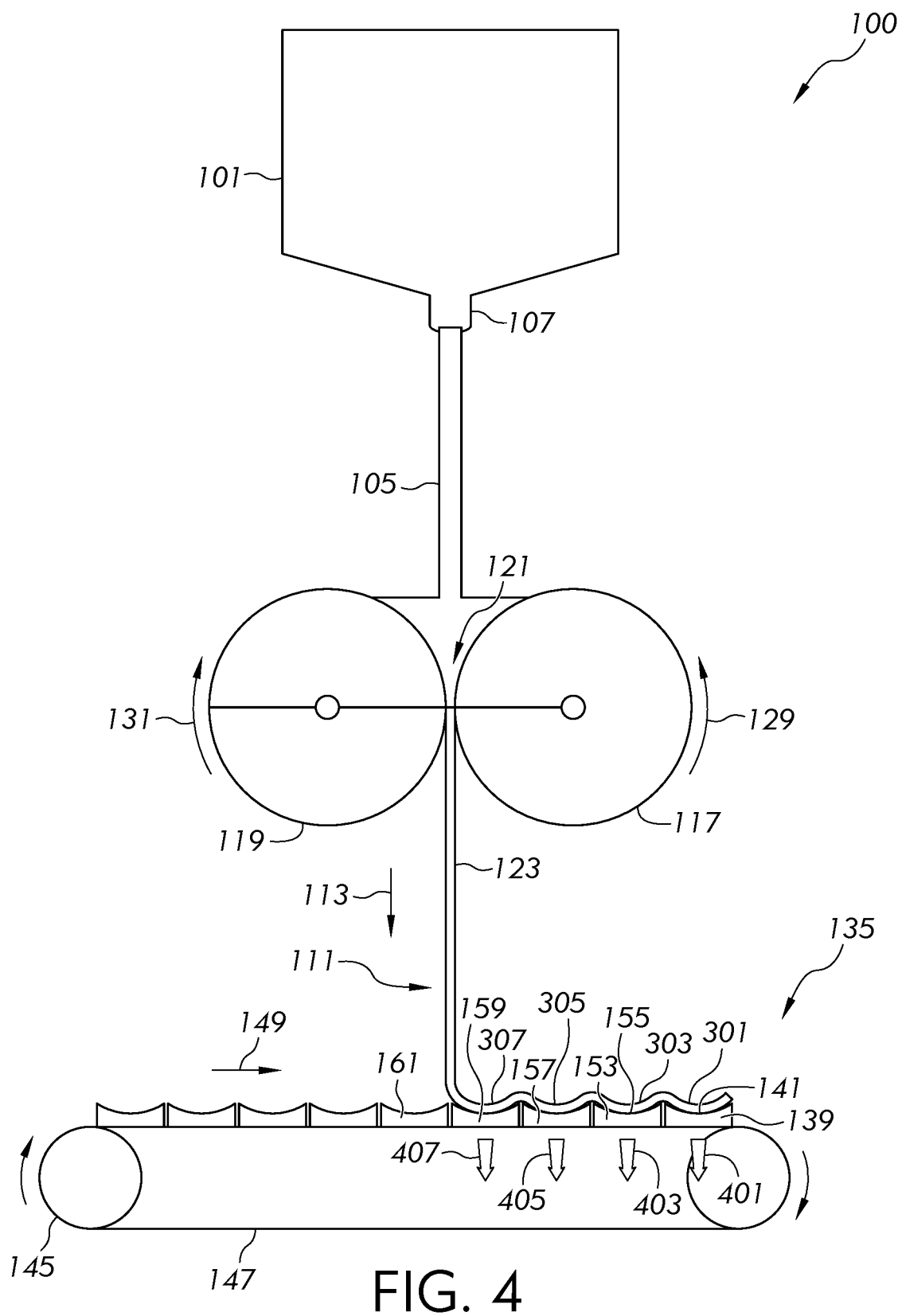
FIG. 4 illustrates a side view of the glass manufacturing apparatus of FIG. 3 after a vacuum has been formed between the mold and a glass ribbon in accordance with embodiments of the disclosure.
Figure 5:
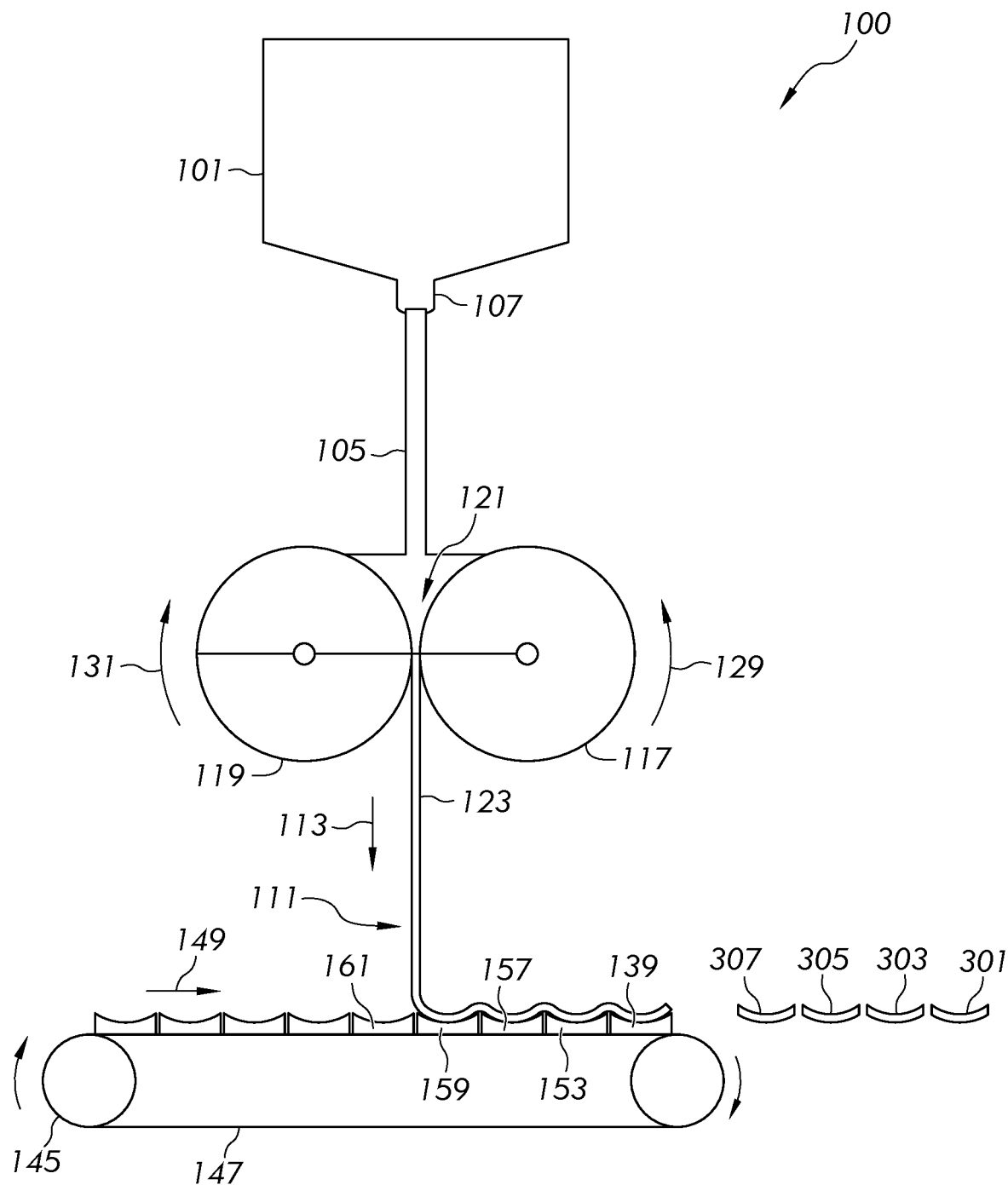
FIG. 5 illustrates a side view of the glass manufacturing apparatus of FIG. 4 after a shape has been imparted to the glass ribbon and the glass ribbon has been separated into portions in accordance with embodiments of the disclosure.

In some embodiments, the shaping apparatus 135 may not be limited to a single mold (e.g., the mold 139), but, rather, can comprise one or more molds. For example, the shaping apparatus 135 can comprise a second mold 153 defining a second mold cavity 155, with the second mold 153 supported by the conveyor 145. In some embodiments, the conveyor 145 can support additional molds, for example, a third mold 157, a fourth mold 159, a fifth mold 161, etc. In some embodiments, the second mold cavity 155 can receive a second portion of the glass ribbon 123 within the second mold cavity 155 to impart a shape to the second portion of the glass ribbon 123 (e.g., wherein the imparting of the shape is illustrated in FIGS. 4-5). The second mold 153 may be upstream from the mold 139 relative to the second travel direction 149. For example, by being located upstream from the mold 139 relative to the second travel direction 149, in some embodiments, the mold 139 can first pass the travel path 111 prior to the second mold 153 passing the travel path 111 as the mold 139 and the second mold 153 are moving along the second travel direction 149. In some embodiments, the molds (e.g., 139, 153, 157, 159, 161) may be positioned adjacent to one another on the conveyor belt 147 along the second travel direction 149. As such, as the molds (e.g., 139, 153, 157, 159, 161) move in the second travel direction 149, the mold 139 may first pass the travel path 111, followed by the second mold 153 passing the travel path 111, followed by the third mold 155 passing the travel path 111, followed by the fourth mold 159 passing the travel path 111, followed by the fifth mold 161 passing the travel path 111. Accordingly, a portion of the glass ribbon 123 may first be received within the mold cavity 141, followed by a second portion of the glass ribbon 123 being received within the second mold cavity 155, followed by a third portion of the glass ribbon 123 being received within a third mold cavity of the third mold 157, followed by a fourth portion of the glass ribbon 123 being received within a fourth mold cavity of the fourth mold 159, followed by a fifth portion of the glass ribbon 123 being received within a fifth mold cavity of the fifth mold 161.

In some embodiments, methods of manufacturing the glass ribbon 123 can comprise delivering the stream of molten glass 105 along the travel path 111 in the first travel direction 113 to the gap 121 defined between the first forming roll 117 and the second forming roll 119. For example, as illustrated in FIG. 1, the stream of molten glass 105 can exit the delivery apparatus 101 and may travel along the upstream portion 102 of the travel path 111 in the first travel direction 113. In some embodiments, the travel path 111 may intersect the gap 121, such that the stream of molten glass 105 may be received within the gap 121. In some embodiments, methods of manufacturing the glass ribbon 123 can comprise passing the stream of molten glass 105 through the gap 121 to form the glass ribbon 123. For example, by passing through the gap 121, in some embodiments, the stream of molten glass 105 may contact a surface of the first forming roll 117 and the second forming roll 119 as the first forming roll 117 and the second forming roll 119 are rotating in the directions 129, 131. Rotation of the first forming roll 117 and the second forming roll 119 can facilitate the passage of the stream of molten glass 105 through the gap 121 and the resulting formation of the glass ribbon 123. In some embodiments, one or more of the first forming roll 117 or the second forming roll 119 can comprise a textured feature (e.g., a protrusion, an outcropping, a channel, indicia, for example, text, a signature, a logo, etc.) on a surface of the first forming roll 117 and/or the second forming roll 119. The textured feature can be transferred to the glass ribbon 123. In some embodiments, passing the stream of molten glass 105 through the gap 121 can comprise forming the glass ribbon 123 with the thickness 125 such that the thickness 125 may be within about 100 microns of a final thickness of the glass ribbon 123 after the glass ribbon 123 has been removed from mold cavities of the molds (e.g., 139, 153, 157, 159, 161). In some embodiments, the width (e.g., illustrated in FIG. 7) may be within about 100 microns of a final width of the glass ribbon 123 after the glass ribbon 123 has been removed from mold cavities of the molds (e.g., 139, 153, 157, 159, 161). As used herein, the final thickness and the final width of the glass ribbon 123 may comprise the thickness and the width of the glass ribbon 123 after the glass ribbon 123 has been received within the mold cavities of the molds (e.g., 139, 153, 157, 159, 161), separated into discrete ribbon portions, removed from the mold cavities and manufactured, for example, by machining, grinding, polishing, etc. As such, the dimensions of the glass ribbon 123 after passing through the gap 121 and after being shaped by the mold cavities of the molds (e.g., 139, 153, 157, 159, 161) may be similar to (e.g., within about 100 microns of) the final desired dimensions of the glass ribbon 123 after exiting the mold cavities and after machining. Accordingly, excessive manufacturing of the ribbon portions, for example, via machining, grinding, polishing, etc., may be avoided due to the close match between the dimensions of the glass ribbon 123 after being removed from the mold cavities and the desired dimensions that may be achieved by machining the glass ribbon 123. In some embodiments, the final thickness of the glass ribbon 123 may be within a range of from about 0.5 millimeters (mm) to about 5 mm.

In some embodiments, methods of manufacturing the glass ribbon 123 can comprise, after passing the stream of molten glass 105 through the gap 121, delivering the glass ribbon 123 to the mold cavity 141 defined by the mold 139 positioned on the conveyor 145 downstream from the gap 121. For example, in some embodiments, the mold 139 can be positioned below the gap 121 and may be intersected by the travel path 111. As the mold 139 moves in the second travel direction 149, the mold cavity 141 may receive a portion of the glass ribbon 123. The mold 139 may continue to move in the second travel direction 149 such that the mold 139 may no longer be intersected by the travel path 111 but, rather, the second mold 153 may be moved to a location below the gap 121 such that the travel path 111 may intersect the second mold 153. The second mold 153 can receive a second portion of the glass ribbon 123 within the second mold cavity 155.

Figure 2:
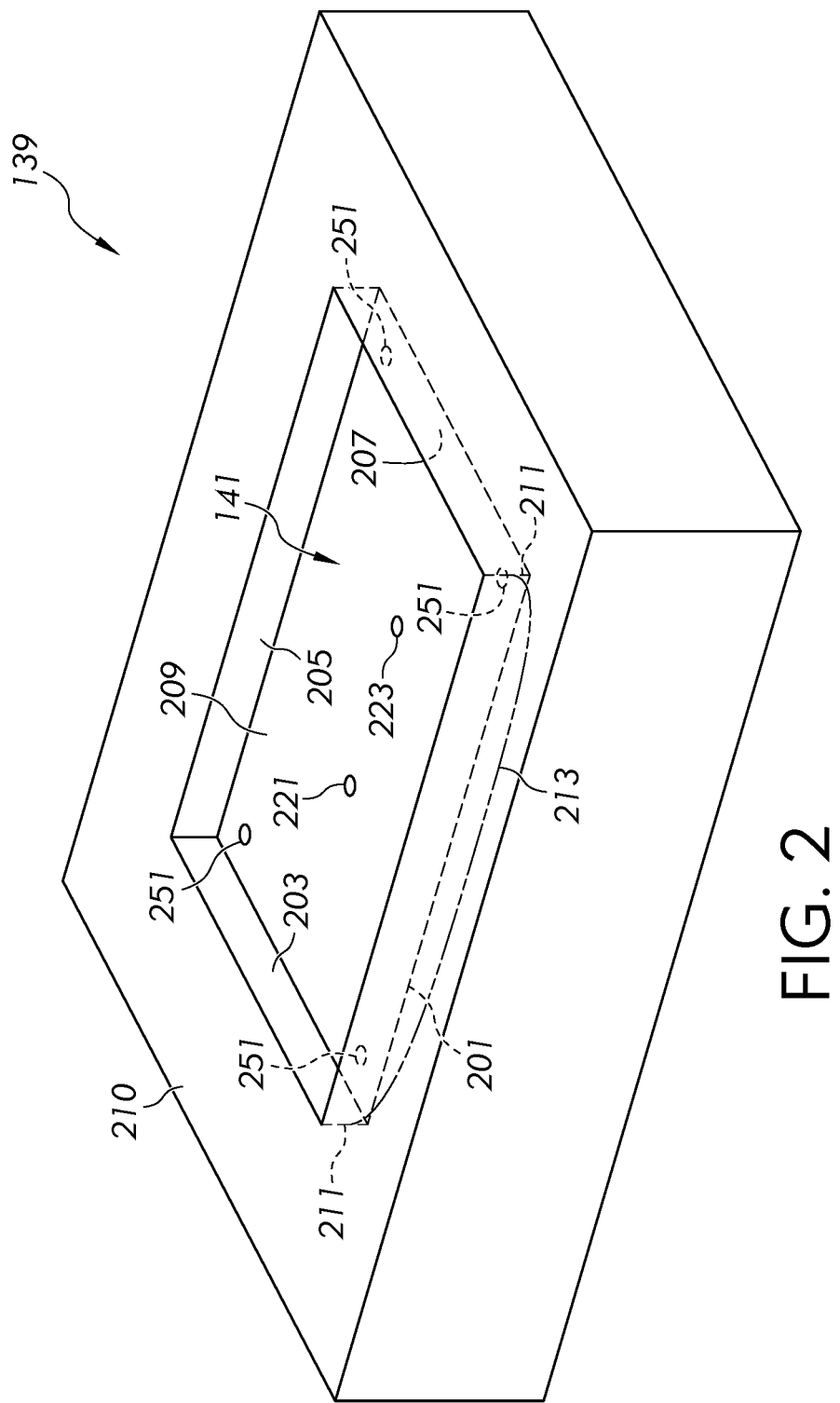
FIG. 2 illustrates an enlarged perspective view of a mold of the glass manufacturing apparatus taken at view 2 of FIG. 1 in accordance with embodiments of the disclosure.

FIG. 2 illustrates embodiments of the mold 139 taken at view 2 of FIG. 1. In some embodiments, the mold 139 may be substantially identical to the other molds of FIG. 1, for example, the second mold 153, the third mold 157, the fourth mold 159, the fifth mold 161, etc. As such, the description of mold 139 pertaining to the size, shape, structure, function, etc. of the mold 139 and the mold cavity 141 may be substantially identical to one or more of the second mold 153, the third mold 157, the fourth mold 159, the fifth mold 161, etc. Accordingly, in this way, in some embodiments, the shaping apparatus 135 can receive the glass ribbon 123 (e.g., within the molds 139, 153, 157, 159, 161) and produce ribbon portions of substantially identical sizes and shapes. However, in some embodiments, the shaping apparatus 135 (e.g., illustrated in FIG. 1) may comprise molds (139, 153, 157, 159, 161) of differing sizes and/or shapes. For example, in some embodiments, one or more of the molds (139, 153, 157, 159, 161) may differ from another of the molds (139, 153, 157, 159, 161). Accordingly, in this way, in some embodiments, shaping apparatus 135 can receive the glass ribbon 123 (e.g., within the molds 139, 153, 157, 159, 161) and produce ribbon portions of differing sizes and shapes (e.g., with some of the ribbon portions comprising a first size or shape and other of the ribbon portions comprising a differing second size or shape).

As illustrated in FIG. 2, the mold 139 can comprise one or more mold walls that define the mold cavity 141. For example, the mold 139 can comprise a mold wall 201, a second mold wall 203, a third mold wall 205, and a fourth mold wall 207 that define the mold cavity 141. In some embodiments, one or more of the mold walls 201, 203, 205, 207 can comprise a planar shape. In some embodiments, one or more of the mold walls 201, 203, 205, 207 can comprise a non-planar shape. For example, the mold wall 201 (e.g., and/or one or more of the other mold walls 203, 205, 207) can comprise a planar shape (e.g., with a planar shaped wall 211 represented by planar dashed lines in FIG. 2) or a non-planar shape (e.g., with a non-planar shaped wall 213 represented by non-planar, rounded dashed lines in FIG. 2). In some embodiments, the mold wall 201 (e.g., and/or one or more of the other mold walls 203, 205, 207) may be non-planar along a length of the mold wall 201, for example, by being non-planar between the second mold wall 203 and the fourth mold wall 207). In other embodiments (e.g., as illustrated in FIG. 2), the mold wall 201 (e.g., and/or one or more of the other mold walls 203, 205, 207) may be non-planar along a height of the mold wall 201 in a direction away from a base wall 209 of the mold 139. Depending on the shape of the mold walls 201, 203, 205, 207, the shape of the portion of the glass ribbon 123 received within the mold cavity 141 can be modified. For example, in some embodiments, if opposing mold walls (e.g., the mold wall 201 and the third mold wall 205) comprise a non-planar rounded shape similar to the non-planar shaped wall 213, then the portion of the glass ribbon 123 received within the mold cavity 141 can comprise curved sidewalls. In some embodiments, if the mold walls 201, 203, 205, 207 comprise a planar shape that extend substantially perpendicularly to the base wall 209, then the portion of the glass ribbon 123 received within the mold cavity 141 can comprise planar sidewalls.

In some embodiments, the planar shaped wall 211 can be non-planar in a direction from the base wall 209 toward a top surface wall 210 that may be spaced apart from the base wall 209. The top surface wall 210 can form a surface within which the mold cavity 141 may be formed, wherein the mold cavity 141 may be recessed from the top surface wall 209. In some embodiments, in a direction between the base wall 209 and the top surface wall 210, one or more of the mold walls 201, 203, 205, 207 can comprise a non-planar shape, for example, by being angled outwardly. As such, by comprising the non-planar shape, the one or more mold walls 201, 203, 205, 207 can comprise a larger cross-sectional size at a top of the mold walls 201, 203, 205, 207 (e.g., at the intersection of the mold walls 201, 203, 205, 207 and the top surface wall 210) than at a bottom of the mold walls 201, 203, 205, 207 (e.g., at the intersection of the mold walls 201, 203, 205, 207 and the base wall 209). In this way, the portion of the glass ribbon 123 can be removed from the mold cavity 141 after vacuum formation. In some embodiments, the mold walls 201, 203, 205, 207 can comprise a non-planar shape in a direction that is between adjacent mold walls. For example, as indicated by the non-planar shaped wall 213, one of the mold walls (e.g., the mold wall 201) can comprise a non-planar shape between adjacent mold walls 203, 207. In this way, the mold cavity 141 can comprise a shape that is narrower at a center (e.g., an hourglass shape) or wider at a center.

In some embodiments, the mold 139 can comprise one or more openings in the base wall 209, for example, a first opening 221 and a second opening 223. The first opening 221 and the second opening 223 can extend through the base wall 209 and, in some embodiments, may be in fluid communication with a vacuum device. For example, the vacuum device can evacuate air from the mold cavity 141 through the first opening 221 and the second opening 223. As such, when the portion of the glass ribbon 123 is received within the mold cavity 141, air can be drawn through the first opening 221 and the second opening 223. A vacuum can be formed within the mold cavity 141 between the base wall 209 and the portion of the glass ribbon 123 received within the mold cavity 141. The vacuum can cause the glass ribbon 123 to be drawn toward and into contact with the base wall 209 along with the mold walls 201, 203, 205, 207. In some embodiments, additional or other vacuum openings can be provided in the base wall 209. For example, in some embodiments, in addition to, or in the alternative of, the first opening 221 and/or the second opening 223, the base wall 209 can comprise openings 251 positioned at corners of the base wall 209, wherein the corners may be located adjacent to an intersection of the base wall 209 and two of the mold walls 201, 203, 205, 207. For example, one opening 251 can be located in the base wall 209 at the intersection of the mold walls 201, 203, another opening 251 can be located in the base wall 209 at the intersection of the mold walls 201, 207, another opening 251 can be located in the base wall 209 at the intersection of the mold walls 205, 207, and another opening 251 can be located in the base wall 209 at the intersection of the mold walls 203, 205. By providing the openings 251 at corners of the base wall 209, a vacuum can be formed within the mold cavity 141 between corner portions of the ribbon, thus allowing for more efficient shape imparting to the ribbon. As a result of the contact between the glass ribbon 123 and the base wall 209 and the mold walls 201, 203, 205, 207, a shape of the glass ribbon 123 can be altered, with the mold 139 imparting a shape to the glass ribbon 123 that matches a shape of the base wall 209 and the mold walls 201, 203, 205, 207. For example, in some embodiments, the base wall 209 may be substantially planar, such that the portion of the glass ribbon 123 in contact with the base wall 209 may similarly be substantially planar. In some embodiments, the base wall 209 may comprise a non-planar shape, such that the portion of the glass ribbon 123 in contact with the base wall 209 may similarly comprise the non-planar shape.

Figure 3:
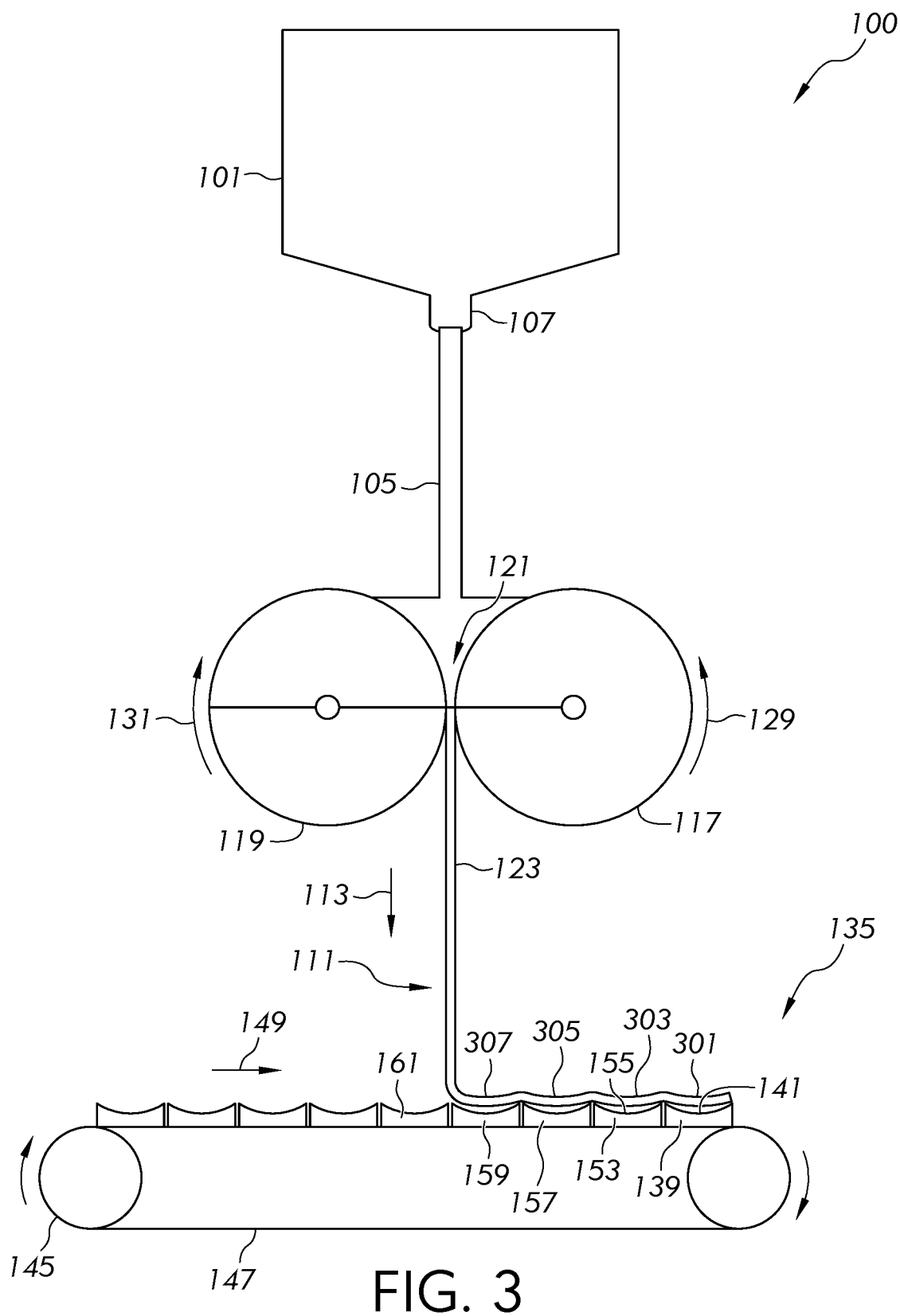
FIG. 3 illustrates a side view of the glass manufacturing apparatus of FIG. 1 after the mold has moved from a first position to a second position after a period of time has passed from the first position of FIG. 1 in accordance with embodiments of the disclosure.

Referring to FIG. 3, the glass manufacturing apparatus 100 is illustrated after a period of time has passed from the embodiments illustrated in FIG. 1, such that the molds 139, 153, 157, 159 may move in the second travel direction 149 from a first position (e.g., illustrated in FIG. 1) to a second position (e.g., illustrated in FIG. 3). For example, in some embodiments, methods of manufacturing the glass ribbon 123 can comprise moving the mold 139 (e.g., a first mold and the other molds 153, 157, 159) along the second travel direction 149 at an angle relative to the first travel direction 113. By moving the molds 139, 153, 157, 159 along the second travel direction 149 via the conveyor 145, the molds 139, 153, 157, 159 can receive portions of the glass ribbon 123. For example, in some embodiments, methods can comprise delivering a first portion 301 of the glass ribbon 123 to a first mold cavity (e.g., the mold cavity 141) defined by a first mold (e.g., the mold 139) positioned on the conveyor 145. In some embodiments, the first portion 301 can comprise a leading portion of the glass ribbon 123 relative to the first travel direction 113. The first portion 301 can be received by the mold 139 when the mold 139 is located below the gap 121 at a time when the travel path 111 of the glass ribbon 123 intersects the mold 139. As the conveyor 145 moves the molds 139, 153, 157, 159 in the second travel direction 149, the first portion 301 may be moved or conveyed by the conveyor 145 in the second travel direction 149.

Following the movement of the first portion 301 and the mold 139, methods of manufacturing the glass ribbon 123 can comprise delivering a second portion 303 of the glass ribbon 123 to the second mold cavity 155 defined by the second mold 153 positioned on the conveyor 145. In some embodiments, the second portion 303 can be located upstream from the first portion 301 relative to the first travel direction 113. The second portion 303 can be received by the second mold 153 as the second mold 153 is moved to be located below the gap 121 at a time when the travel path 11 of the glass ribbon 123 intersects the second mold 153. As the conveyor 145 moves the molds 139, 153, 157, 159 in the second travel direction 149, the second portion 303 may be moved or conveyed by the conveyor 145 in the second travel direction 149. In some embodiments, the second mold 153 may be located upstream from the first mold (e.g., the mold 139) relative to the second travel direction 149 such that the first portion 301 of the glass ribbon 123 may be delivered to the first mold cavity 141 prior to the second portion 303 of the glass ribbon 123 being delivered to the second mold cavity 155. In some embodiments, as the molds 139, 153, 157, 159 continue to move along the second travel direction 149, a third portion 305 of the glass ribbon 123 may be received by the third mold 157 and a fourth portion 307 of the glass ribbon 123 may be received by the fourth mold 159. As illustrated in FIG. 3, in some embodiments, the fifth mold 161 may be moved into position to receive a portion (e.g., a fifth portion) of the glass ribbon 123. As illustrated in FIG. 3, initially, the portions 301, 303, 305, 307 of the glass ribbon 123 may be received by the molds 139, 153, 157, 159 without a shape imparted to the portions 301, 303, 305, 307 by the molds 139, 153, 157, 159. Though a shape may not yet be imparted to the portions 301, 303, 305, 307 by the molds 139, 153, 157, 159, in some embodiments, the portions 301, 303, 305, 307 may sag at least partially into the mold cavities of the molds 139, 153, 157, 159 such that the portions 301, 303, 305, 307 may not remain planar. For example, one or more of the portions 301, 303, 305, 307 of the glass ribbon 123 can rest upon the molds 139, 153, 157, 159 and/or one or more of the portions 301, 303, 305, 307 of the glass ribbon 123 can extend at least partially into mold cavities of the molds 139, 153, 157, 159. However, prior to the formation of a vacuum to the molds 139, 153, 157, 159, the portions 301, 303, 305, 307 of the glass ribbon 123 may not be exposed to a sufficient amount of pressure to cause a deformation and/or a shape formation of the portions 301, 303, 305, 307 of the glass ribbon 123.

Referring to FIG. 4, the glass manufacturing apparatus 100 is illustrated after a period of time has passed from the embodiments illustrated in FIG. 3, such that a vacuum has been formed within the molds 139, 153, 157, 159 and a shape has been imparted from the molds 139, 153, 157, 159 to the portions 301, 303, 305, 307 of the glass ribbon 123. For example, in some embodiments, methods of manufacturing the glass ribbon 123 can comprise imparting a shape to the glass ribbon 123 by receiving the glass ribbon 123 within the mold cavity 141. For example, imparting the shape can comprise imparting a first shape to the first portion 301 of the glass ribbon 123 by receiving the first portion 301 of the glass ribbon 123 within the first mold cavity 141. In some embodiments, imparting the shape (e.g., the first shape) can comprise forming a vacuum (e.g., a first vacuum 401 represented with an arrow) between the glass ribbon 123, for example, the first portion 301, and the mold 139 as the first portion 301 of the glass ribbon 123 is received within the mold cavity 141. As illustrated in FIG. 2, the vacuum between the first portion 301 and the mold 139 can be formed by evacuating air from the mold cavity 141 through the first opening 221 and the second opening 223. Due to the glass ribbon 123 being in a viscous state, the first portion 301 can be drawn into the mold cavity 141 and can conform to a shape of the mold 139, such that a shape can be imparted from the mold 139 to the first portion 301.

In some embodiments, the other portions 303, 305, 307 of the glass ribbon 123 can have shapes imparted by the molds 153, 157, 159 in a similar manner. For example, methods of manufacturing the glass ribbon 123 can comprise imparting a second shape to the second portion 303 of the glass ribbon 123 by receiving the second portion 303 of the glass ribbon 123 within the second mold cavity 155. For example, imparting the second shape can comprise forming a vacuum (e.g., a second vacuum 403 represented with an arrow) between the second portion 303 of the glass ribbon 123 and the second mold 153 as the second portion 303 of the glass ribbon 123 is received within the second mold cavity 155. Similar to the first shape imparted to the first portion 301, the second shape can be imparted to the second portion 303 due to the vacuum between the second portion 303 and the mold 139. For example, the vacuum can be formed by evacuating air from the second mold cavity 155 through openings (e.g., similar to the first opening 221 and the second opening 223). Due to the second portion 303 being in a viscous state, the second portion 303 can be drawn into the second mold cavity 155 and can conform to a shape of the second mold 153, such that a second shape can be imparted from the second mold 153 to the second portion 303. In some embodiments, a vacuum can be formed between the third portion 305 of the glass ribbon 123 and the third mold 157, such that a third shape can be imparted from the third mold 157 to the third portion 305. In some embodiments, a vacuum can be formed between the fourth portion 307 of the glass ribbon 123 and the fourth mold 159, such that a fourth shape can be imparted from the fourth mold 159 to the fourth portion 307.

In some embodiments, as used herein, imparting a shape to the glass ribbon 123, for example, the first portion 301, the second portion 303, the third portion 305, and/or the fourth portion 307, can comprise altering an initial shape of the portions 301, 303, 305, 307 (e.g., prior to the formation of the vacuum) by conforming the portion 301, 303, 305, 307 to substantially match a shape of a mold cavity of one of the molds. For example, in some embodiments, the portions 301, 303, 305, 307 may initially comprise a shape that sags into the molds 139, 153, 157, 159 (e.g., illustrated in FIG. 3) prior to the formation of the vacuum between the molds 139, 153, 157, 159 and the glass ribbon 123. With reference to the first portion 301, the first portion 301 may initially comprise the planar or substantially planar shape (e.g., illustrated in FIG. 3) that may not conform to the non-planar shape of the mold cavity 141. Upon the formation of the vacuum, the first portion 301 can be drawn into the mold cavity 141 and into contact with one or more of the mold walls (e.g., illustrated in FIG. 2) defining the mold cavity 141, for example, the mold wall 201, the second mold wall 203, the third mold wall 205, the fourth mold wall 207, and/or the base wall 209. The vacuum can result in a force being applied to the first portion 301 in a direction toward the base wall 209, such that the first portion 301 can change in shape from an initial shape, (e.g., that may be planar or substantially planar) to a shape that substantially matches a shape of the mold cavity 141. In some embodiments, one or more of the mold walls 201, 203, 205, 207, 209 may comprise non-planar shapes, such that the non-planar shapes may be imparted to portions of the first portion 301.

In some embodiments, the conveyor 145 can continue to move the molds 139, 153, 157, 159 in the second travel direction 149 as the vacuum 401, 403, 405, 407 is formed between the molds 139, 153, 157, 159 and the portions 301, 303, 305, 307 of the glass ribbon 123. For example, as the molds 139, 153, 157, 159 continue to move in the second travel direction 149, the portions 301, 303, 305, 307 of the glass ribbon 123 may likewise travel in the second travel direction 149. In this way, a relative velocity between the portions 301, 303, 305, 307 of the glass ribbon 123 and the molds 139, 153, 157, 159 may be zero or close to zero. For example, with the relative velocity being zero or close to zero, the portions 301, 303, 305, 307 of the glass ribbon 123 may move at substantially the same velocity as the molds 139, 153, 157, 159, with both the portions 301, 303, 305, 307 of the glass ribbon 123 and the molds 139, 153, 157, 159 moving in the second travel direction 149. As the portions 301, 303, 305, 307 of the glass ribbon 123 and the molds 139, 153, 157, 159 move in the second travel direction 149, the vacuums 401, 403, 405, 407 can be formed, thus imparting the shapes to the portions 301, 303, 305, 307 of the glass ribbon 123. In some embodiments, the vacuums 401, 403, 405, 407 can be formed simultaneously, such that the shapes may be imparted to the portions 301, 303, 305, 307 of the glass ribbon 123 simultaneously. In other embodiments, however, the vacuums 401, 403, 405, 407 can be formed at differing times, such that the shapes may be imparted to the portions 301, 303, 305, 307 of the glass ribbon 123 at differing times.

Referring to FIG. 5, in some embodiments, following the formation of the shapes of the portions 301, 303, 305, 307, the portions 301, 303, 305, 307 can be removed from the molds 139, 153, 157, 159. For example, in some embodiments, during the removal process, the portions 301, 303, 305, 307 can be separated. In some embodiments, the first portion 301 can be separated from the second portion 303, the second portion 303 can be separated from the third portion 305, and the third portion 305 can be separated from the fourth portion 307. The portions 301, 303, 305, 307 can be separated in several ways, for example, with a cutting device (e.g., a scoring device, a laser, etc.). In some embodiments, the portions 301, 303, 305, 307 can be separated simultaneously or sequentially. For example, by separating the portions 301, 303, 305, 307 simultaneously, the cutting device can separate the first portion 301 from the second portion 303, the second portion 303 from the third portion 305, and the third portion 305 from the fourth portion 307 at the same time. In some embodiments, however, the portions 301, 303, 305, 307 can be separated sequentially. For example, initially, the first portion 301 can be separated from the second portion 303. Next, after a period of time, the second portion 303 can be separated from the third portion 305. Then, after a period of time, the third portion 305 can be separated from the fourth portion 307. In these embodiments (e.g., whether simultaneous or sequential separation of the portions 301, 303, 305, 307), the portions 301, 303, 305, 307 can be separated while being supported by the molds 139, 153, 157, 159.

As illustrated in FIG. 5, the portions 301, 303, 305, 307 may be removed from the molds 139, 153, 157, 159 following the separation and transferred to a different location. In some embodiments, due to the dimensions of the glass ribbon 123 and, thus, the portions 301, 303, 305, 307 of the glass ribbon 123 formed from the rolls 117, 119 and the molds 139, 153, 157, 159, the dimensions of the glass ribbon 123 can substantially match the desired final dimensions of the portions 301, 303, 305, 307. For example, in some embodiments, the thickness of the portions 301, 303, 305, 307 may be within about 100 microns of a desired final thickness (e.g., after the portions 301, 303, 305, 307 have been removed from the molds 139, 153, 157, 159). Likewise, in some embodiments, the width of the portions 301, 303, 305, 307 may be within about 100 microns of a desired final thickness (e.g., after the portions 301, 303, 305, 307 have been removed from the molds 139, 153, 157, 159). Accordingly, in some embodiments, additional manufacturing steps of the portions 301, 303, 305, 307 following removal from the molds 139, 153, 157, 159 may be avoided. For example, the additional manufacturing steps that may be avoided can comprise, machining, grinding, etching, polishing, etc. Rather, following the removal of the portions 301, 303, 305, 307 from the molds 139, 153, 157, 159, the size and shape of the portions 301, 303, 305, 307 may substantially match a desired final size and final shape. With the portions 301, 303, 305, 307 removed from the molds 139, 153, 157, 159, the conveyor 145 can continue to move the other molds (e.g., the fifth mold 161 and other molds moving in the second travel direction 149 that may not have received portions of the glass ribbon 123 yet) along the second travel direction 149 and into position to receive portions of the glass ribbon 123, whereupon the aforementioned process can be repeated.

Figure 6:
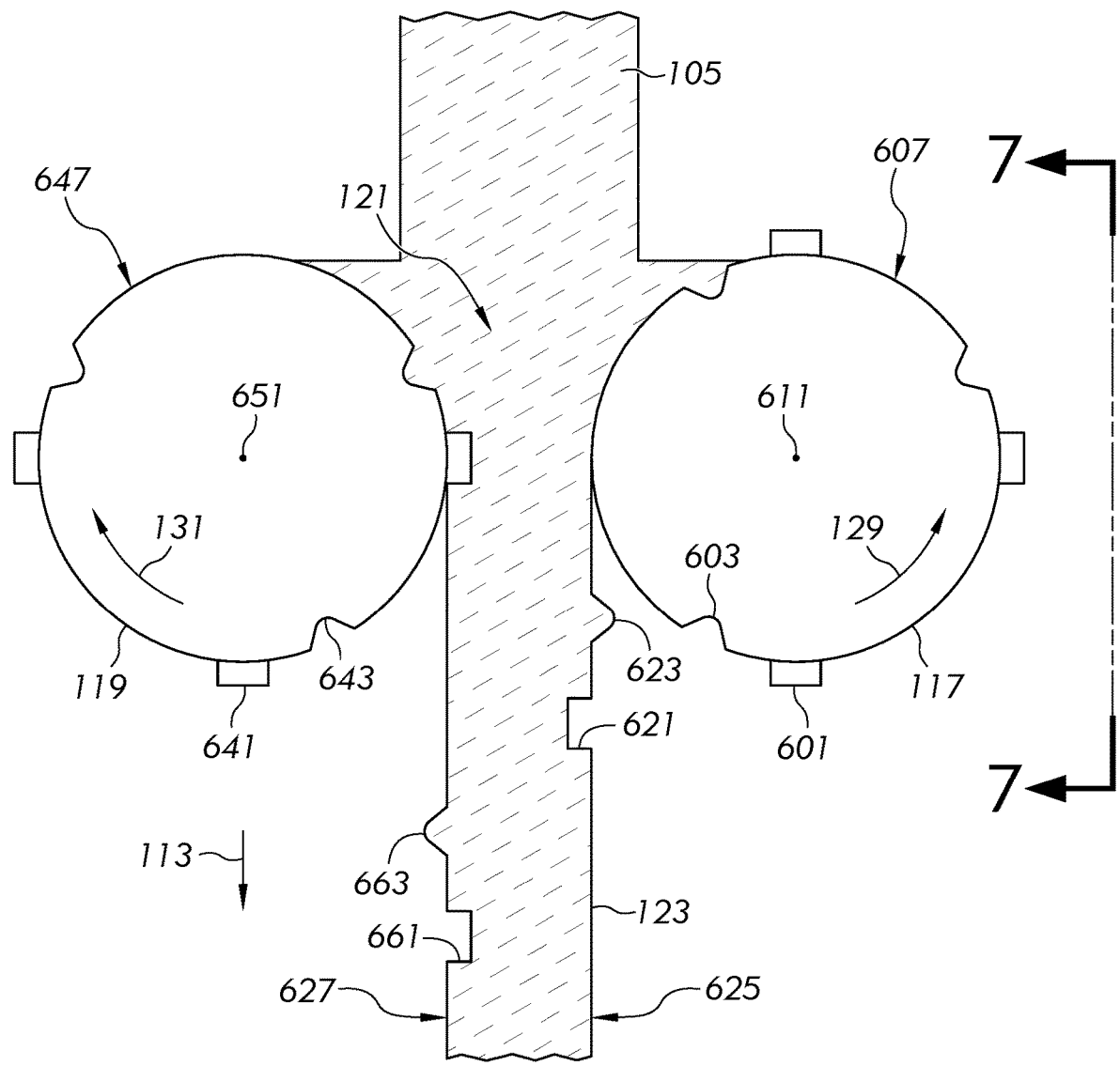
FIG. 6 illustrates an enlarged side view of a first forming roll and a second forming roll of the glass manufacturing apparatus taken at view 6 of FIG. 1 in accordance with embodiments of the disclosure.

Referring to FIG. 6, an enlarged view of the first forming roll 117 and the second forming roll 119 as viewed from the perspective of view 6 of FIG. 1 is illustrated. In some embodiments, one or more of the first forming roll 117 or the second forming roll 119 can comprise a textured feature that may impart a corresponding textured feature to the glass ribbon 123. For example, in some embodiments, the first forming roll 117 can comprise a plurality of textured features, for example, a first textured feature 601, a second textured feature 603, etc. While several different types of textured features are contemplated, in some embodiments, the textured features can comprise, for example, projections (e.g., extensions, outcroppings, etc.), channels (e.g., openings, furrows, etc.). As illustrated and described relative to FIG. 7, in some embodiments, the first textured feature 601, the second textured feature 603, etc. can comprise an indicia comprising one or more of a logo, image or text (e.g., a signature, a name, etc.). Referring to FIG. 6, in some embodiments, the first textured feature 601 can comprise an outcropping and the second textured feature 603 can comprise a channel. The first textured feature 601 and the second textured feature 603 can be formed at an outer surface 607 of the first forming roll 117. For example, the outer surface 607 can form a substantially circular cross-sectional shape. In some embodiments, the first textured feature 601 can comprise the projection that extends outwardly from the outer surface 607 of the first forming roll 117. Accordingly, a radial distance from a center of the first forming roll 117 to an outermost surface of the first textured feature 601 (e.g., the projection) may be greater than a radial distance from a center of the first forming roll 117 to the outer surface 607 of the first forming roll 117 at a location of the first forming roll 117 at which the first textured feature 601 and the second textured feature 603 are not present. In some embodiments, the second textured feature 603 can comprise the channel that extends inwardly from the outer surface 607 of the first forming roll 117 toward a center of the first forming roll 117. Accordingly, a radial distance from a center of the first forming roll 117 to an innermost surface of the second textured feature 603 (e.g., the channel) may be less than a radial distance from a center of the first forming roll 117 to the outer surface 607 of the first forming roll 117 at a location of the first forming roll 117 at which the first textured feature 601 and the second textured feature 603 are not present. In some embodiments, the first textured feature 601 and the second textured feature 603 can be spaced apart about a circumference of the first forming roll 117. In addition, or in the alternative, in some embodiments, additional textured features may be located at differing locations about a circumference of the first forming roll 117. In addition, or in the alternative, in some embodiments, additional textured features may be located at differing locations about a longitudinal axis 611 (e.g., about which the outer surface 607 extends, and which goes through the center of the first forming roll 117) of the first forming roll 117.

In some embodiments, the textured features 601, 603 can impart a corresponding textured feature 621, 623 to the glass ribbon 123. For example, as the stream of molten glass 105 travels through the gap 121, the stream of molten glass 105 can contact the first forming roll 117 and the second forming roll 119 such that the glass ribbon 123 can be formed and may exit the gap 121. In some embodiments, the contact between the first forming roll 117 and the glass ribbon 123 can impart the corresponding textured features 621, 623 to the glass ribbon 123. For example, with reference to the first textured feature 601, the first textured feature 601 can project into the stream of molten glass 105, which can cause a corresponding void in a first major surface 625 of the glass ribbon 123. The void, in the form of a first corresponding textured feature 621, can be the result of the first textured feature 601 projecting into the first major surface 625 and may comprise an absence of glass material. In some embodiments, as the first forming roll 117 rotates in the counter-clockwise direction 129, the glass ribbon 123 can continue to travel in the first travel direction 113, whereupon a second corresponding textured feature 623 can be formed in the first major surface 625. For example, the glass ribbon 123 can contact the first forming roll 117 and may contact the second textured feature 603, for example, by flowing into the channel of the second textured feature 603. As a result, the second textured feature 603 can cause a corresponding projection in the first major surface 625. The projection, in the form of a second corresponding textured feature 623, can be the result of the glass ribbon 123 flowing into the second textured feature 603 and may comprise a thicker area of the glass ribbon 123 as compared to locations immediately upstream and downstream from the second corresponding textured feature 623.

The second forming roll 119 can comprise similar textured features to the first forming roll 117 and may form corresponding textured features in the glass ribbon 123 similar to the first corresponding textured feature 621 and the second corresponding textured feature 623. For example, in some embodiments, the second forming roll 119 can comprise a plurality of textured features, for example, a first textured feature 641, a second textured feature 643, etc. While several different types of textured features are contemplated, in some embodiments, the textured features can comprise, for example, projections (e.g., extensions, outcroppings, etc.), channels (e.g., openings, furrows, etc.). In some embodiments, the first textured feature 641 can comprise an outcropping and the second textured feature 643 can comprise a channel. The first textured feature 641 and the second textured feature 643 can be formed at an outer surface 647 of the second forming roll 119. For example, the outer surface 647 can form a substantially circular cross-sectional shape. In some embodiments, the first textured feature 641 can comprise the projection that extends outwardly from the outer surface 647 of the second forming roll 119. Accordingly, a radial distance from a center of the second forming roll 119 to an outermost surface of the first textured feature 641 (e.g., the projection) may be greater than a radial distance from a center of the second forming roll 119 to the outer surface 647 of the second forming roll 119 at a location of the second forming roll 119 at which the first textured feature 641 and the second textured feature 643 are not present. In some embodiments, the second textured feature 643 can comprise the channel that extends inwardly from the outer surface 647 of the second forming roll 119 toward a center of the second forming roll 119. Accordingly, a radial distance from a center of the second forming roll 119 to an innermost surface of the second textured feature 643 (e.g., the channel) may be less than a radial distance from a center of the second forming roll 119 to the outer surface 647 of the second forming roll 119 at a location of the second forming roll 119 at which the first textured feature 641 and the second textured feature 643 are not present. In some embodiments, the first textured feature 641 and the second textured feature 643 can be spaced apart about a circumference of the second forming roll 119. In addition, or in the alternative, in some embodiments, additional textured features may be located at differing locations about a circumference of the second forming roll 119. In addition, or in the alternative, in some embodiments, additional textured features may be located at differing locations about a longitudinal axis 651 (e.g., about which the outer surface 647 extends, and which goes through the center of the second forming roll 119) of the second forming roll 119.

In some embodiments, the textured features 641, 643 can impart a corresponding textured feature 661, 663 to the glass ribbon 123. In some embodiments, as the stream of molten glass 105 contacts the forming rolls 117, 119, corresponding textured features may be imparted into the glass ribbon 123 and may remain in the glass ribbon 123. For example, as the stream of molten glass 105 travels through the gap 121, the stream of molten glass 105 can contact the second forming roll 119. In some embodiments, the contact between the second forming roll 119 and the glass ribbon 123 can impart the corresponding textured features 661, 663 to the glass ribbon 123. For example, with reference to the first textured feature 641, the first textured feature 641 can project into the stream of molten glass 105, which can cause a corresponding void in a second major surface 627 of the glass ribbon 123. The void, in the form of a first corresponding textured feature 661, can be the result of the first textured feature 641 projecting into the second major surface 627 and may comprise an absence of glass material. In some embodiments, as the second forming roll 119 rotates in the clockwise direction 131, the glass ribbon 123 can continue to travel in the first travel direction 113, whereupon a second corresponding textured feature 663 can be formed in the second major surface 627. For example, the glass ribbon 123 can contact the second forming roll 119 and may contact the second textured feature 643, for example, by flowing into the channel of the second textured feature 643. As a result, the second textured feature 643 can cause a corresponding projection in the second major surface 627. The projection, in the form of a second corresponding textured feature 663, can be the result of the glass ribbon 123 flowing into the second textured feature 643 and may comprise a thicker area of the glass ribbon 123 as compared to locations immediately upstream and downstream from the second corresponding textured feature 663.

Figure 7:
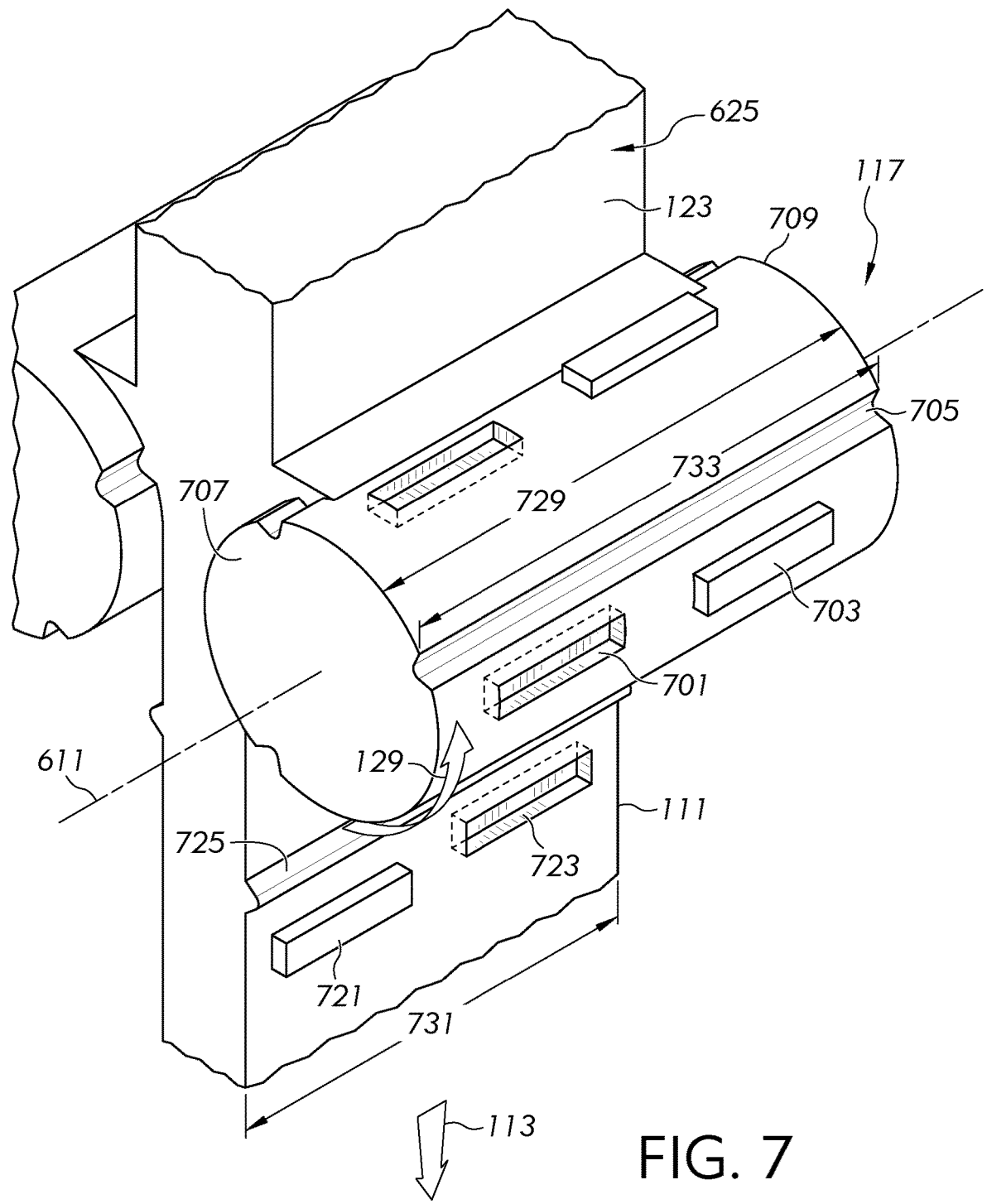
FIG. 7 illustrates a side view of the first forming roll along line 7-7 of FIG. 6 in which the first forming roll comprises one or more textured features in accordance with embodiments of the disclosure.

FIG. 7 illustrated a side view of the first forming roll 117 as viewed from the perspective indicated by lines 7-7 of FIG. 6. In addition to, or in the alternative of, the textured features 601, 603 illustrated in FIG. 6, in some embodiments, the first forming roll 117 can comprise one or more textured features 701, 703, 705 that may be arranged along the longitudinal axis 611 of the first forming roll 117. The textured features 701, 703 are not limited to being oriented along an axis that is parallel to the longitudinal axis 611, but, rather, the textured features 701, 703 can be arranged at differing locations about a circumference of the first forming roll 117, similar to the differing circumferential location of a third textured feature 705 relative to that of a first textured feature 701 and a second textured feature 703. In some embodiments, the first forming roll 117 can comprise the first textured feature 701 and the second textured feature 703 spaced apart along an axis that may be parallel to the longitudinal axis 611. In some embodiments, the first textured feature 701 may be located in closer proximity to a first end 707 of the first forming roll 117 than to the center of the length of the forming roll, and, similarly, the second textured feature 703 may be located in closer proximity to a second end 709 of the first forming roll 117 than to the center of the length of the first forming roll 117. In FIG. 7, the one or more of the first textured feature 701 or the second textured feature 703 can comprise indicia comprising one or more of a logo, image or text. For example, when the indicia comprises a logo, the indicia can comprise a company logo, for example, a graphic mark, emblem, symbol, etc. In some embodiments, when the indicia comprises an image, the indicia can comprise a two-dimensional or three-dimensional picture. In some embodiments, when the indicia comprises text, the indicia can comprise a marking that can be transferred to the glass ribbon and read. For example, the text can comprise letters that form a company name, a person's name, etc. In some embodiments, the text can be stylized such that the indicia can comprise a signature, for example, a handwritten depiction of a person's name or a company's name.

In some embodiments, to transfer the indicia from the first forming roll 117 to the glass ribbon 123, the first textured feature 701 and the second textured feature 703 may comprise an inverse image, for example, a negative and a mirror image, of the indicia (e.g., a logo, image, text, etc.). In some embodiments, one or more of the textured features, for example, the first textured feature 701, can define a channel (e.g., a groove, a depression, a furrow, etc.) that projects radially inwardly from a surface of the first forming roll 117 toward the longitudinal axis 611. When the first textured feature 701 comprises a channel, the first textured feature 701 can impart a first corresponding textured feature 721 to the glass ribbon 123 that may comprise a protrusion, for example, due to the glass ribbon 123 contacting the first forming roll 117 and flowing into the first textured feature 701 (e.g., a channel). Accordingly, in some embodiments, when the first textured feature 701 comprises a channel, the first corresponding textured feature 721 can comprise additional glass material (e.g., due to the glass material from the glass ribbon 123 flowing into the first textured feature 701) such that a thickness of the glass ribbon 123 at the first corresponding textured feature 721 may be greater than a thickness of the glass ribbon 123 at other locations (e.g., where corresponding textured features are not present).

In some embodiments, one or more of the textured features, for example, the second textured feature 703, can define a projection (e.g., an outcropping, a protuberance, etc.) that projects radially outwardly from a surface of the first forming roll 117 away from the longitudinal axis 611. When the second textured feature 703 comprises a projection, the second textured feature 703 can impart a second corresponding textured feature 723 to the glass ribbon 123 that may comprise a channel, for example, due to the glass ribbon 123 contacting the first forming roll 117 and the second textured feature 703 extending into the first major surface 625 of the glass ribbon 123. Accordingly, in some embodiments, when the second textured feature 703 comprises a projection, the second textured feature 703 can comprise a reduced amount of glass material (e.g., due to the glass material from the glass ribbon 123 being displaced by the second textured feature 703). As such, a thickness of the glass ribbon 123 at the second textured feature 703 may be less than a thickness of the glass ribbon 123 at other locations (e.g., where corresponding textured features are not present). In this way, the first forming roll 117 can form and/or transfer an indicia (e.g., via the first textured feature 701, the second textured feature 703, etc.) to the glass ribbon 123, wherein the indicia may comprise one or more of a logo, image or text. Further, the indicia formed in the first major surface 625 of the glass ribbon 123 can comprise a channel (e.g., the second corresponding textured feature 723) or a projection (e.g., the first corresponding textured feature 721).

Accordingly, in some embodiments, methods can comprise imparting a corresponding textured feature (e.g., 721, 723, 725) to the glass ribbon 123 with the textured feature (e.g., 701, 703, 705) of the one or more of the first forming roll 117 or the second forming roll 119. In some embodiments, imparting the corresponding textured feature (e.g., 721, 723, 725) can comprise forming a thickness variation or a non-planar shape in the glass ribbon 123. The corresponding textured feature (e.g., 721, 723, 725) of the glass ribbon 123 can comprise a varying thickness within the glass ribbon 123. For example, as used herein, the varying thickness can represent a non-constant thickness of the glass ribbon 123 at differing locations of the glass ribbon 123. For example, at one location (e.g., at the location of the first corresponding textured feature 721 that comprises additional glass material forming a projection), the glass ribbon 123 can comprise a thickness that is greater than other locations (e.g., at locations where corresponding textured features are not present and/or at the location of the second corresponding textured feature 723). At another location (e.g., at the location of the second corresponding textured feature 723 that comprises a channel), the glass ribbon 123 can comprise a thickness that is less than other locations (e.g., at locations where corresponding textured features are not present and/or at the location of the first corresponding textured feature 721). In some embodiments, the non-planar shape can be imparted in several ways. For example, in some embodiments, as a result of the corresponding textured features (e.g., 721, 723, 725) imparted by the textured feature (e.g., 701, 703, 705), the first major surface 625 (e.g., and/or the second major surface 627) of the glass ribbon 123 can comprise a non-planar shape due to the formation of one or more channels, projections, etc. at the location of the corresponding textured features (e.g., 721, 723, 725). In some embodiments, the non-planar shape can be imparted to the glass ribbon 123 by the molds (e.g., 139, 153, 157, 159, 161) due to the vacuum formed between the molds (e.g., 139, 153, 157, 159, 161) and the portions of the glass ribbon 123. As such, shapes can be imparted in several ways to the glass ribbon 123, for example, by the textured features (e.g., 601, 603, 641, 643, 701, 703, 705) of the forming rolls 117, 119, or by the molds (e.g., 139, 153, 157, 159, 161).

In some embodiments, the first forming roll 117 and the second forming roll 119 may each comprise a first length 729 that may be greater than or equal to a width 731 of the travel path 111. In some embodiments, a textured feature, for example, the third textured feature 705, can comprise a second length 733 that may be greater than or equal to the width 731 of the travel path 111. In some embodiments, if the third textured feature 705 comprises a projection or protrusion, then the third corresponding textured feature 725 may comprise a channel or a thin spot within the glass ribbon 123, thus facilitating a later separation of the glass ribbon 123 at the location of the third corresponding textured feature 725. For example, in some embodiments, the third textured feature 705 can comprise a groove or a projection that extends substantially entirely along a length of the first forming roll 117 between the first end 707 and the second end 709. Due to the first forming roll 117 comprising the first length 729 that may be greater than or equal to the width 731 (e.g., of the glass ribbon 123 traveling along the travel path 111), when the third textured feature 705 extends along the first length 729 and comprises the second length 733, the third textured feature 705 can form the third corresponding textured feature 725 that extends along the entire width 731 (e.g., of the glass ribbon 123 traveling along the travel path 111). In some embodiments, the third textured feature 705 can comprise a length (e.g., the first length 729) that may differ from the width 731 of the travel path 111. By differing from the width 731, the third textured feature 705 may be greater than (e.g., as illustrated) or less than the width 731. In some embodiments, the third textured feature 705 can comprise the length (e.g., the first length 729) that may be greater than or equal to the width 731 of the travel path 111. In some embodiments, the third textured feature 705 can comprise the length (e.g., the first length 729) that may be less than the width 731 of the travel path 111. By extending across the entire width 731, the glass ribbon 123 can subsequently be separated into the portions (e.g., after a shape has been imparted by the molds), with a corresponding textured feature (e.g., the third corresponding textured feature 705) extending across an entire dimension (e.g., length or width) of the portion of the glass ribbon 123.

The glass manufacturing apparatus 100 comprising the shaping apparatus 135 and the textured features 601, 603, 641, 643, 701, 703, 705 can provide several benefits. For example, the glass ribbon 123 produced by the glass manufacturing apparatus 100 can comprise a shape and/or one or more textured surface features that may be imparted by the molds (e.g., 139, 153, 157, 159, 161) and/or the textured features (e.g., 601, 603, 641, 643, 701, 703, 705) of the forming rolls 117, 119. In some embodiments, the molds (e.g., 139, 153, 157, 159, 161) can impart a non-planar shape to portions of the glass ribbon 123. The non-planar shape can comprise a curved shape, a shape with rounded edges, etc. Due to the vacuum formed by the molds (e.g., 139, 153, 157, 159, 161), additional machining of the glass ribbon 123 to form the non-planar shape may be avoided. Further, the molds (e.g., 139, 153, 157, 159, 161) can be arranged on the conveyor 147, such that the molds (e.g., 139, 153, 157, 159, 161) can receive the glass ribbon 123 and impart the non-planar shape to the glass ribbon 123 as the glass ribbon 123 continues to move (e.g., in the second travel direction 149). In this way, downtime (e.g., caused by machining of the glass ribbon 123) may be avoided, and the process to form the non-planar shape may be sped up. In addition to the formation of the non-planar shape in the glass ribbon 123, the textured features (e.g., 601, 603, 641, 643, 701, 703, 705) of the forming rolls 117, 119 can impart corresponding textured features (e.g., 621, 623, 661, 663, 721, 723, 725) to the glass ribbon 123. In some embodiments, by imparting the corresponding textured features (e.g., 621, 623, 661, 663, 721, 723, 725) with the forming rolls 117, 119, additional machining of the glass ribbon 123 (e.g., to form textured features) may be avoided. Further, the corresponding textured features (e.g., 621, 623, 661, 663, 721, 723, 725) can be imparted as the glass passes by the forming rolls 117, 119, thus speeding up the process of imparting textured features to the glass ribbon 123. In some embodiments, several types of corresponding textured features (e.g., 621, 623, 661, 663, 721, 723, 725) can be imparted to the glass ribbon 123, for example, an indicia comprising one or more of a logo, image or text (e.g., a signature). In some embodiments, the final shape of the portions of the glass ribbon 123 may be near-net (e.g., close to a desired final dimension and shape) while being slightly larger in dimension. By being slightly larger in dimension (e.g., length, width, thickness, etc.), portions of the glass ribbon 123 can be removed (e.g., by machining, polishing, grinding, etc.) to achieve the desired final dimension and shape.

As used herein the terms "the," "a," or "an," mean "one or more," and should not be limited to "only one" unless explicitly indicated to the contrary. Thus, for example, reference to "a component" includes embodiments having two or more such components unless the context clearly indicates otherwise.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, as defined above, "substantially similar" is intended to denote that two values are equal or approximately equal. In some embodiments, "substantially similar" may denote values within about 10% of each other, for example within about 5% of each other, or within about 2% of each other.

As used herein, the terms "comprising" and "including," and variations thereof shall be construed as synonymous and open-ended, unless otherwise indicated.

While various embodiments have been described in detail relative to certain illustrative and specific embodiments thereof, the present disclosure should not be considered limited to such, as numerous modifications and combinations of the disclosed features are envisioned without departing from the scope of the following claims.

What is claimed is:

1. A method of manufacturing a glass ribbon comprising:
delivering a stream of molten glass along a travel path in a first travel direction to a gap defined between a first forming roll and a second forming roll, one or more of the first forming roll or the second forming roll comprising a textured feature, the textured feature comprising a first textured feature and a second textured feature, the first textured feature and the second textured feature spaced apart along an axis that is parallel to a longitudinal axis about which the one or more of the first forming roll or the second forming roll rotates, and wherein the first textured feature is a projection that defines a first radial distance from a center of the one or more of the first forming roll or the second forming roll to an outermost surface of the first textured feature, and the second textured feature is a channel that defines a second radial distance from the center of the one or more of the first forming roll or the second forming roll to an innermost surface of the second textured feature, wherein the first radial distance is greater than an intermediate radial distance from the center of the one or more of the first forming roll or the second forming roll to an outermost surface of the one or more of the first forming roll or the second forming roll at a location of the one or more of the first forming roll or the second forming roll at which the first textured feature and the second textured feature are not present, and wherein the second radial distance is less than the intermediate radial distance, the first textured feature comprising a first length along the axis that is greater than a first width of the first textured feature, and the second textured feature comprising a second length along the axis that is greater than a second width of the second textured feature;

passing the stream of molten glass through the gap to form a glass ribbon;

imparting a corresponding textured feature to the glass ribbon with the textured feature of the one or more of the first forming roll or the second forming roll;

spacing the first forming roll from the second forming roll to define a size of the gap between the first forming roll and the second forming roll such that the glass ribbon comprises a thickness and a width after the stream of molten glass has passed through the gap and after the corresponding textured feature has been imparted to the glass ribbon, and wherein the thickness is within about 100 microns of a final thickness of the glass ribbon, and the width is within about 100 microns of a final width of the glass ribbon, and wherein the final thickness of the glass ribbon is within a range from about 0.5 millimeters to about 5 millimeters;

delivering the glass ribbon to a mold cavity defined by a mold positioned on a conveyor downstream from the gap;

imparting a shape to the glass ribbon by receiving the glass ribbon within the mold cavity; and removing the glass ribbon from the mold cavity, separating the glass ribbon into discrete ribbon portions, and manufacturing a first ribbon portion of the discrete ribbon portions by removing at least some of the first ribbon portion to reduce the thickness to achieve the final thickness, and wherein the manufacturing of the first ribbon portion comprises removing at least some of the first ribbon portion to reduce the width to achieve the final width, such that, after the removal, the separation, and the manufacturing of the first ribbon portion, the first ribbon portion of the glass ribbon comprises the final thickness and the final width.

2. The method of claim 1, wherein the first forming roll and the second forming roll each comprise a first length that is greater than or equal to the width of the glass ribbon.

3. The method of claim 2, wherein the textured feature comprises a length that differs from the width of the glass ribbon.

4. The method of claim 1, wherein the first textured feature and/or the second textured feature further comprises indicia comprising one or more of a logo or text.

5. The method of claim 1, wherein the imparting the corresponding textured feature comprises forming a thickness variation in the glass ribbon, wherein the thickness variation comprises a first thickness from the first textured feature at a first location of the glass ribbon, a second thickness from the second textured feature at a second location of the glass ribbon, and a third thickness at a third location of the glass ribbon that is between the first location and the second location, wherein the third thickness is greater than the first thickness and less than the second thickness, and wherein the first location, the second location, and the third location are arranged along a width of the glass ribbon.

6. The method of claim 5, wherein the imparting the shape comprises forming a vacuum between the glass ribbon and the mold as the glass ribbon is received within the mold cavity.

7. The method of claim 6, wherein the imparting the corresponding textured feature comprises forming a non-planar shape in the glass ribbon.

8. The method of claim 1, wherein the textured feature further comprises a third textured feature formed on the one or more of the first forming roll or the second forming roll, the third textured feature located at a different circumferential location than the first textured feature and the second textured feature about a circumference of the one or more of the first forming roll or the second forming roll, and wherein the third textured feature comprises a length that is greater than or equal to a width of the travel path.

9. The method of claim 1, wherein the first textured feature comprises a non-planar shape comprising a varying thickness.

10. A method of manufacturing a glass ribbon comprising:
delivering a stream of molten glass along a travel path in a first travel direction to a gap defined between a first forming roll and a second forming roll, the first forming roll comprising a textured feature, wherein the textured feature comprises a first textured feature and a second textured feature that are spaced apart about a circumference of the first forming roll, and wherein the first textured feature is a projection that defines a first radial distance from a center of the first forming roll to an outermost surface of the first textured feature, and the second textured feature is a channel defined by a pair of oppositely facing side surfaces extending continuously across an entire length of the first forming roll in a direction of a longitudinal axis about which the first forming roll rotates, the channel defining a second radial distance from the center of the first forming roll to an innermost surface of the second textured feature, wherein the first radial distance is greater than an intermediate radial distance from the center of the first forming roll to an outermost surface of the first forming roll at a location of the first forming roll at which the first textured feature and the second textured feature are not present, and wherein the second radial distance is less than the intermediate radial distance;

passing the stream of molten glass through the gap to form a glass ribbon, wherein the glass ribbon comprises a thickness and a width after the stream of molten glass has passed through the gap, and wherein the thickness is larger than a final thickness of the glass ribbon and within about 100 microns of the final thickness of the glass ribbon, and the width is larger than a final width of the glass ribbon and within about 100 microns of the final width of the glass ribbon;

imparting corresponding textured features to a first portion of the glass ribbon with the first textured feature and the second textured feature of the first forming roll;

delivering the first portion of the glass ribbon to a first mold cavity defined by a first mold positioned on a conveyor;

imparting a first shape to the first portion of the glass ribbon by receiving the first portion of the glass ribbon within the first mold cavity;

moving the first mold along a second travel direction at an angle relative to the first travel direction;

delivering a second portion of the glass ribbon to a second mold cavity defined by a second mold positioned on the conveyor;

imparting a second shape to the second portion of the glass ribbon by receiving the second portion of the glass ribbon within the second mold cavity; and removing the glass ribbon from the second mold cavity, separating the glass ribbon into discrete ribbon portions comprising the first portion and the second portion, and manufacturing the first portion and the second portion by one or more of machining, grinding, or polishing the first portion and the second portion, wherein the manufacturing of the first portion comprises removing at least some of the first portion to reduce the thickness to achieve the final thickness, and wherein the manufacturing of the first portion comprises removing at least some of the first portion to reduce the width to achieve the final width, such that, after the removal, the separation, and the manufacturing of the first portion and the second portion, the first portion of the glass ribbon comprises the final thickness and the final width, and the second portion of the glass ribbon comprises the final thickness and the final width.

11. The method of claim 10, wherein the first forming roll and the second forming roll each comprise a first length that is greater than or equal to the width of the glass ribbon.

12. The method of claim 11, wherein the textured feature comprises a length that differs from the width of the glass ribbon.

13. The method of claim 12, wherein the imparting the shape comprises forming a vacuum between the first portion of the glass ribbon and the first mold as the first portion of the glass ribbon is received within the first mold cavity.

14. The method of claim 13, wherein the imparting the second shape comprises forming a vacuum between the second portion of the glass ribbon and the second mold as the second portion of the glass ribbon is received within the second mold cavity.

15. The method of claim 10, wherein delivering the stream of molten glass comprises passing the stream of molten glass from a delivery apparatus and to the gap between the first forming roll and the second forming roll such that the stream of molten glass accumulates between the first forming roll and the second forming roll.

16. The method of claim 15, wherein the delivery apparatus comprises a delivery conduit defining an elongated passageway through which the stream of molten glass passes and exits the delivery conduit, the delivery conduit comprising a circular shape such that the stream of molten glass comprises a substantially circular cross-sectional shape upon exiting the delivery conduit.

17. The method of claim 10, wherein the textured feature further comprises a third textured feature formed on the first forming roll, the third textured feature spaced apart from the first textured feature along the longitudinal axis.

18. The method of claim 10, wherein the channel is further defined by a bottom surface interconnecting the oppositely facing side surfaces, the bottom surface extending continuously across the entire length of the first forming roll in the direction of the longitudinal axis.

19. A method of manufacturing a glass ribbon comprising:
delivering a stream of molten glass along a travel path in a first travel direction to a gap defined between a first forming roll and a second forming roll, wherein the first forming roll comprises a textured feature comprising a first textured feature and a second textured feature, the first textured feature and the second textured feature are spaced apart along an axis that is parallel to a longitudinal axis about which the first forming roll rotates, and wherein the first textured feature is a projection that defines a first radial distance from a center of the first forming roll to an outermost surface of the first textured feature, and the second textured feature is a channel that defines a second radial distance from the center of the first forming roll to an innermost surface of the second textured feature, wherein the first radial distance is greater than an intermediate radial distance from the center of the first forming roll to an outermost surface of the first forming roll at a location of the first forming roll at which the first textured feature and the second textured feature are not present, and wherein the second radial distance is less than the intermediate radial distance, the first textured feature comprising a first length along the axis that is greater than a first width of the first textured feature, and the second textured feature comprising a second length along the axis that is greater than a second width of the second textured feature;

passing the stream of molten glass through the gap to form a glass ribbon, wherein the glass ribbon comprises a thickness and a width after the stream of molten glass has passed through the gap, and wherein the thickness is within about 100 microns of a final thickness of the glass ribbon, and the width is within about 100 microns of a final width of the glass ribbon;

imparting a corresponding textured feature to the glass ribbon with the textured feature of the first forming roll;

delivering the glass ribbon to a mold cavity defined by a mold positioned on a conveyor downstream from the gap;

imparting a shape to the glass ribbon by receiving the glass ribbon within the mold cavity; and removing the glass ribbon from the mold cavity and separating the glass ribbon into discrete ribbon portions while not performing manufacturing steps comprising machining, grinding, and polishing, such that, after the removal and the separation, the glass ribbon comprises the final thickness and the final width without performing the manufacturing steps.

20. The method of claim 19, wherein the textured feature further comprises a third textured feature formed on the first forming roll, the third textured feature located at a different circumferential location than the first textured feature and the second textured feature about a circumference of the first forming roll, and wherein the third textured feature comprises a length that is greater than or equal to a width of the travel path.

* * * * *